(12) United States Patent
Shin et al.

(10) Patent No.: US 8,730,208 B2
(45) Date of Patent: May 20, 2014

(54) TOUCH SCREEN APPARATUS AND DRIVING METHOD THEREOF

(75) Inventors: Myungho Shin, Gyeonggi-do (KR); Jonggu Heo, Seoul (KR); Kyounghwan Kim, Seoul (KR); Younggyu Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 47 days.

(21) Appl. No.: 13/572,829

(22) Filed: Aug. 13, 2012

(65) Prior Publication Data

US 2013/0057507 A1    Mar. 7, 2013

(30) Foreign Application Priority Data

Sep. 5, 2011  (KR) .......................... 10-2011-0089464
Sep. 27, 2011 (KR) .......................... 10-2011-0097698
Apr. 12, 2012 (KR) .......................... 10-2012-0038059

(51) Int. Cl.
*G06F 3/045* (2006.01)
*G09G 5/00* (2006.01)

(52) U.S. Cl.
USPC .......................................... 345/174; 345/212

(58) Field of Classification Search
USPC .................. 345/690, 691, 697, 589, 211, 212
See application file for complete search history.

(56) References Cited

U.S. PATENT DOCUMENTS

2010/0073357 A1*  3/2010  Min et al. ...................... 345/214
2010/0200310 A1   8/2010  Yeh et al.

\* cited by examiner

*Primary Examiner* — Michael Faragalla
(74) *Attorney, Agent, or Firm* — Morgan, Lewis & Bockius LLP

(57) ABSTRACT

A touch screen apparatus and a driving method thereof are provided. The touch screen drive circuit performs a setup operation for selecting Tx lines to be supplied with the drive signal and Rx lines to receive the voltages of the touch sensors, a sensing operation for supplying a drive signal to the Tx lines and receiving and sampling touch sensor voltages through the Rx lines, an ADC operation for converting the sampled voltages into digital data, a coordinate detection operation for analyzing the digital data by a preset touch detection algorithm and estimating the coordinates of a touch input position, and a data transmission operation for transmitting touch coordinate data comprising the coordinates to an external system. At least two operations among the setup operation, the sensing operation, and the ADC operation are performed in parallel.

20 Claims, 32 Drawing Sheets

| TSN (1,1) | TSN (1,2) | TSN (1,3) | ... | TSN (1,i-2) | TSN (1,i-1) | TSN (1,i) | LINE#1 |
| TSN (2,1) | TSN (2,2) | TSN (2,3) | ... | TSN (2,i-2) | TSN (2,i-1) | TSN (2,i) | LINE#2 |
| | | | : | | | | |
| TSN (j-1,1) | TSN (j-1,2) | TSN (j-j,3) | ... | TSN (j-1,i-2) | TSN (j-1,i-1) | TSN (j-1,i) | LINE#j-1 |
| TSN (j,1) | TSN (j,2) | TSN (j,3) | ... | TSN (j,i-2) | TSN (j,i-1) | TSN (j,i) | LINE#j |

FIG. 18
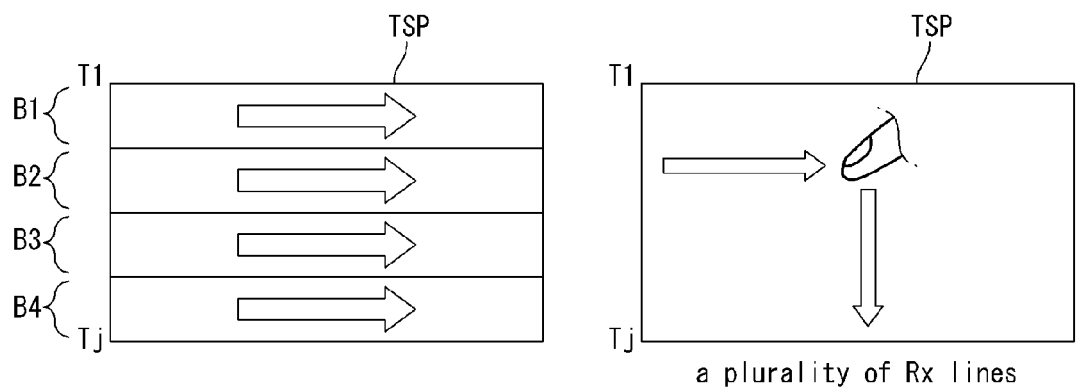
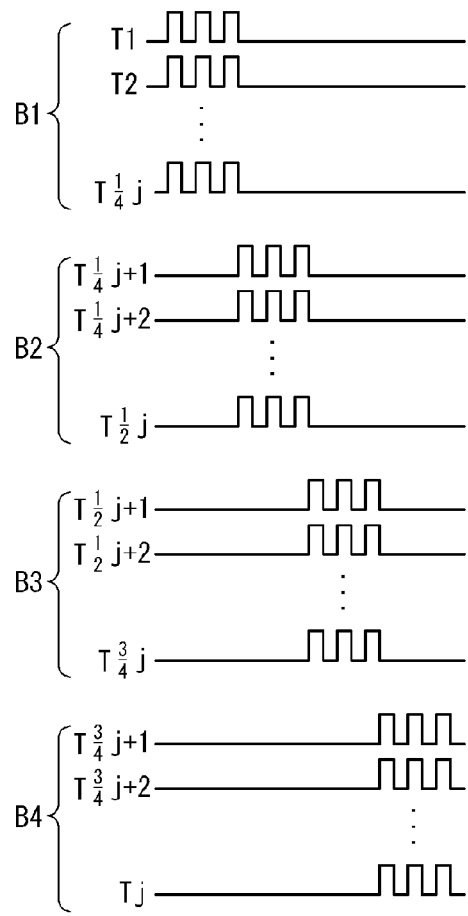

FIG. 29
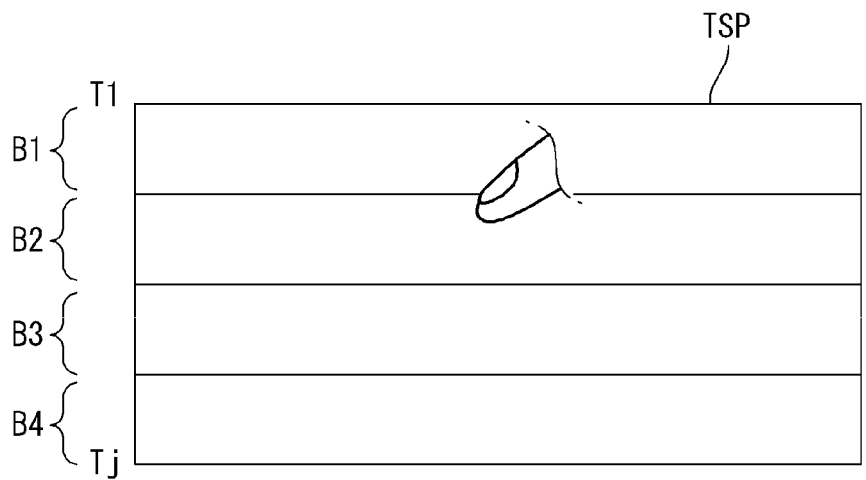
Block sensing
↓ touch
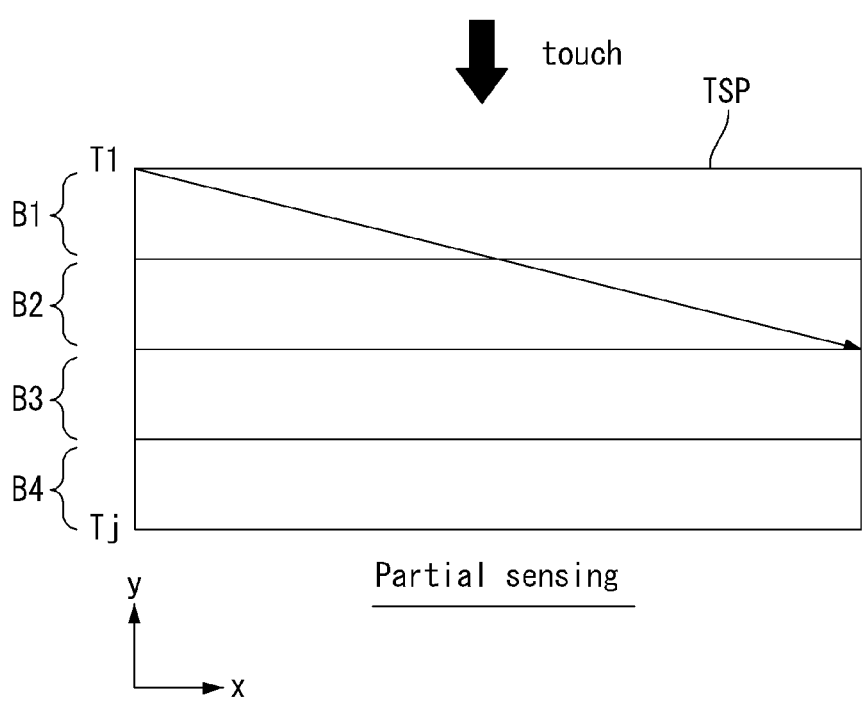
Partial sensing

TOUCH SCREEN APPARATUS AND DRIVING METHOD THEREOF This application claims the benefit of Korean Patent Application No. 10-2011-0089464 filed on Sep. 5, 2011, Korean Patent Application No. 10-2011-0097698 filed on Sep. 27, 2011, and Korean Patent Application No. 10-2012-0038059 filed on Apr. 12, 2012 the entire contents of which are incorporated herein by reference for all purposes as if fully set forth herein.

BACKGROUND

1. Field

This document relates to a touch screen apparatus and a driving method thereof.

2. Related Art

As home appliances or portable information devices are becoming more lightweight and slimmer, user input means is being switched from a button switch to a touch screen. A touch screen comprises a plurality of touch sensors.

U.S. Laid-Open Patent US 2010/0200310 (filed on Aug. 12, 2010) discloses a conventional touch screen (hereinafter, referred to as "Self capacitance touch screen") comprising capacitive touch sensors at the crossings of X lines and Y lines crossing each other. The self capacitance touch screen scans the X lines and convert a signal received from the X lines into digital data by analog-to-digital conversion (hereinafter, referred to as "ADC"), and scans the Y lines and converts a signal received from the Y lines into digital data by ADC. The self capacitance touch screen determines that a touch sensor, positioned at the crossing point of an X line and a Y line and having a large change in capacitance before and after a touch, is a touch position. Such a self capacitance touch screen detects a touch position by analyzing digital data obtained by respectively sensing an X line and a Y line and converting them by ADC, and therefore may mistake a ghost point present at the same X and Y lines as an actual touch position. Accordingly, the self capacitance touch screen has the drawbacks that it has low multi-touch sensitivity and a complicated ghost detection and removal algorithm has to be additionally applied.

The self capacitance touch screen disclosed in U.S. Laid-Open Patent US 2010/0200310A1 senses X lines and Y lines in units of groups in a pre-scan step. Next, the self capacitance touch screen performs a re-scan step and a touch position detection step after an ADC step and a touch position detection step, thereby improving the accuracy of touch recognition. The self capacitance touch screen simultaneously scans X lies (or Y lines) in a group in the pre-scan step, which may lead to a reduction in touch sensing speed, as compared to the method of sequentially sensing all the X lines and Y lines each time a touch position is detected. However, the self capacitance touch screen has limitations in reducing touch sensing speed because it has to sequentially perform pre-scan, ADC, the execution of a touch recognition algorithm, re-scan, ADC, and the execution of the touch recognition algorithm.

A touch report rate is a rate at which coordinate data obtained by sensing all touch sensors present within a touch screen. The higher the touch report rate, the higher the continuity of touch input traces and the higher the touch sensitivity that a user feels. The touch report rate is in inverse proportion to total sensing time required to sense all of the touch sensors within the touch screen. That is, the longer the total sensing time, the lower the touch report rate. Accordingly, the self capacitance touch screen cannot achieve sufficiently high touch report rate.

SUMMARY

The present invention has been made in an effort to provide a touch screen apparatus, which can achieve a reduction in the total sensing time of a touch screen and a higher touch report rate, and a driving method thereof.

One embodiment of the present invention provides a touch screen apparatus comprising: a touch screen comprising Tx lines, Rx lines crossing the Tx lines, and touch sensors formed between the Tx lines and the Rx lines; and a touch screen drive circuit that supplies a drive signal to the Tx lines, and samples voltages of the touch sensors received through the Rx lines and converts the sampled voltages into digital data.

The touch screen drive circuit performs a setup operation for selecting Tx lines to be supplied with the drive signal and Rx lines to receive the voltages of the touch sensors, a sensing operation for supplying a drive signal to the Tx lines and receiving and sampling touch sensor voltages through the Rx lines, an ADC operation for converting the sampled voltages into digital data, a coordinate detection operation for analyzing the digital data by a preset touch detection algorithm and estimating the coordinates of a touch input position, and a data transmission operation for transmitting touch coordinate data comprising the coordinates to an external system.

The touch screen drive circuit performs at least two operations among the setup operation, the sensing operation, and the ADC operation in parallel.

One embodiment of the present invention provides a driving method of a touch screen apparatus, the method comprising: executing a setup operation for selecting Tx lines to be supplied with the drive signal and Rx lines to receive the voltages of the touch sensors; executing a sensing operation for supplying a drive signal to the Tx lines and receiving and sampling touch sensor voltages through the Rx lines; executing an ADC operation for converting the sampled voltages into digital data; executing a coordinate detection operation for analyzing the digital data by a preset touch detection algorithm and estimating the coordinates of a touch input position; and executing a data transmission operation for transmitting touch coordinate data comprising the coordinates to an external system.

In the driving method, at least two operations among the setup operation, the sensing operation, and the ADC operation are performed in parallel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 13 to 18 are views showing a driving method of a touch screen apparatus according to a second exemplary embodiment of the present invention;

FIGS. 20 to 34 are views showing a block sensing process and a partial sensing process according to an exemplary embodiment of the present invention.

DETAILED DESCRIPTION

Figures 1, 2:
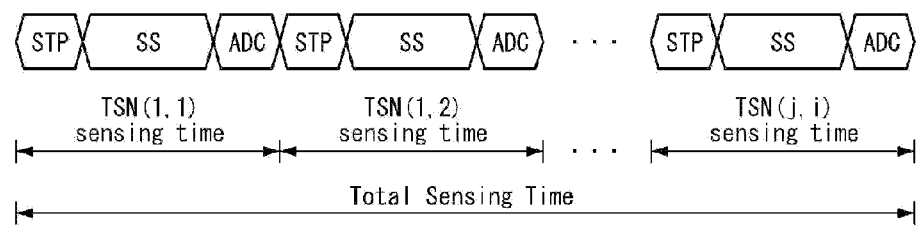
FIG. 1 is a view showing an example of an array of touch sensors of a touch screen.
FIG. 2 is a view showing total sensing time when setup, sensing, and ADC are sequentially performed for each touch sensor in a mutual capacitance touch screen.

Hereinafter, exemplary embodiments of the present invention will be described in detail with reference to the attached drawings. Throughout the specification, the same reference numerals indicate substantially the same components. Further, in the following description, well-known functions or constructions related to the present invention will not be described in detail if it appears that they could obscure the invention in unnecessary detail.

A mutual capacitance touch screen comprises Tx lines, Rx lines crossing the Tx lines, and touch sensors formed between the Tx lines and the Rx lines. Each of the touch sensors has mutual capacitance formed between a Tx line and an Rx line. A touch screen apparatus senses a change in the voltage charged in the touch sensors before and after a touch (or approach), and detects the presence or absence of a contact (or approach) of a conductive object and the position thereof. The mutual capacitance touch screen supplies a drive signal to the Tx lines, and senses a change in the capacitance of each of the touch sensors through the Rx lines in synchronization with the drive signal. The drive signal has been illustrated as taking the form of a pulse for ease of description, but not limited thereto. For example, the drive signal may be produced in various forms, including a circular wave pulse, a sine wave pulse, a triangular wave pulse, etc. Due to this sensing method, the mutual capacitance touch screen is able to sense a voltage change before and after a touch in each of the touch sensors, thereby accurately detecting a multi-touch.

If j (j is a positive integer) Tx lines and i (i is a positive integer) Rx lines cross each other, the touch screen comprises (i×j) touch sensors TSN1,1)~(j,i) formed between the Tx lines and the Rx lines, as shown in FIG. 1. i touch sensors arranged transversely along a line direction are connected to one Tx line, and j touch sensors arranged longitudinally along a column direction are connected to one Rx line.

The touch screen apparatus involves setup (STP), sensing (SS), and ADC processes for each touch sensor, in order to sense voltages of the touch sensors as shown in FIG. 2.

In the STP process, setup signals are generated and transmitted to a Tx driving circuit and an Rx driving circuit to select Tx lines to be supplied with a drive signal and Rx lines to receive touch sensor voltages. In the SS process, a drive signal is supplied to the Tx line selected by the Tx setup signal, and a touch sensor voltage is received and sampled through the Rx line selected by the Rx setup signal. In the ADC process, an analog-to-digital converter incorporated in the Rx driving circuit is used to convert the sampled touch sensor voltage into digital data. That is, a touch detection algorithm is executed in order to analyze touch raw data and estimate a touch (or approach) input position.

In the touch detection algorithm, digital data obtained by an analog-to-digital conversion process is analyzed to estimate a touch (or approach) input position and calculate the coordinates of the touch position. Such a touch detection algorithm may be implemented as any well-known algorithm.

To sense all the touch sensors in the touch screen, the STP, SS, and ADC processes are repeated for each touch sensor. Accordingly, the total sensing time required to sense all the touch sensors in the touch screen is approximately "total sensing time=(STP+SS+ADC) ×i×j". As used herein, "STP" indicates the time required for a setup operation, "SS" indicates the time required for a sensing operation, and "ADC" indicates the time required for an ADC operation.

If the setup, sensing, and ADC are sequentially performed for each touch sensor in this manner, it is difficult to reduce the total sensing time of the touch screen.

In the present invention, the total sensing time of the touch screen can be significantly reduced by performing the setup operation and the sensing operation in parallel, or by performing the sensing operation and the ADC operation in parallel, or by performing the setup operation, the sensing operation, and the ADC operation in parallel.

Figure 3:
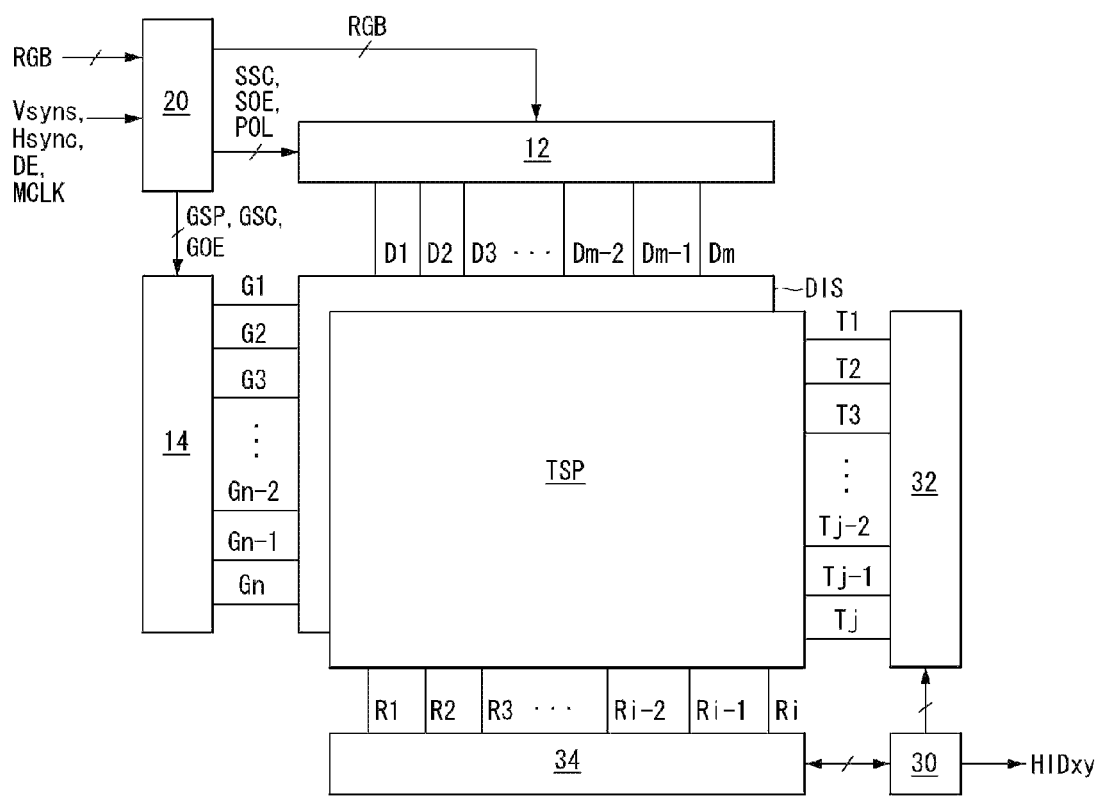
FIG. 3 is a block diagram showing a display device according to an exemplary embodiment of the present invention.
Figure 4:
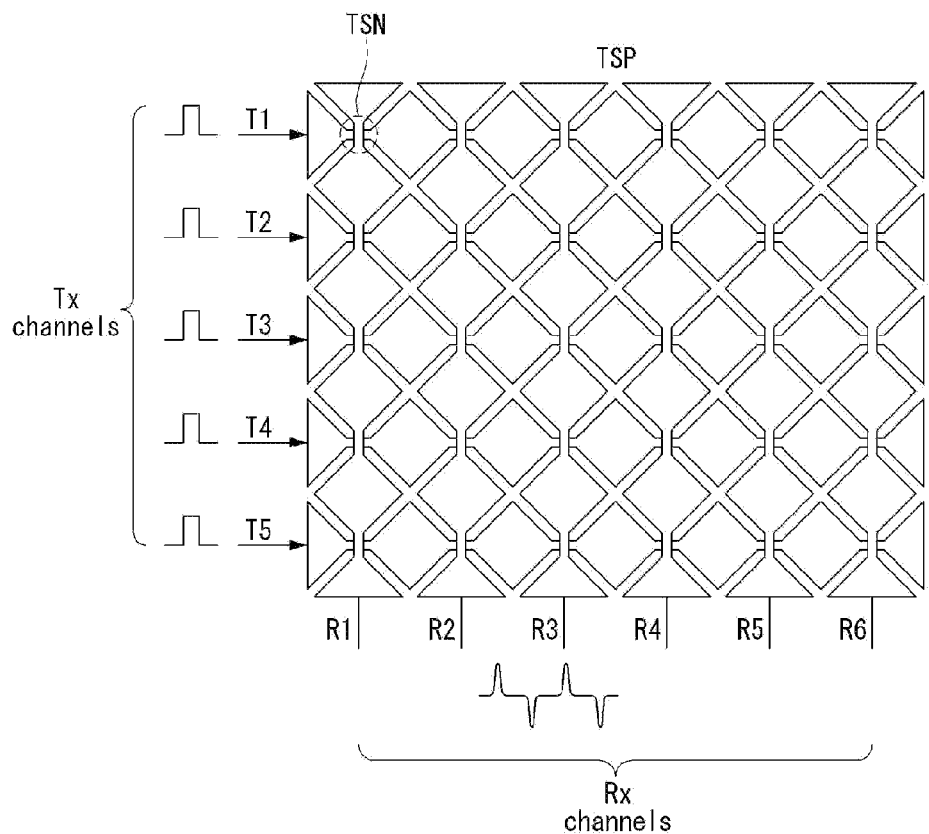
FIG. 4 is a top plan view showing in detail an electrode pattern on an enlarged part of the touch screen of FIG. 3.

Referring to FIGS. 3 and 4, a display device according to an exemplary embodiment of the present invention comprises a display panel DIS, a display drive circuit, and a touch screen apparatus. The touch screen apparatus comprises a touch screen TSP and a touch screen drive circuit.

The display device of the present invention may be implemented as flat display devices such as a liquid crystal display (LCD), a field emission display (FED), a plasma display panel (PDP), an organic light emitting display (OLED), an electrophoresis (EPD), etc. In the following embodiment, the display device will be explained focused on a liquid crystal display as an example of a flat panel display, it should be noted that the display device of the present invention is not limited to the liquid crystal display.

The display panel DIS comprises a liquid crystal layer formed between two glass substrates. Formed on a lower glass substrate of the display panel 10 are a plurality of data lines D1 to Dm (m is a positive integer), a plurality of gate lines G1 to Gm (n is a positive integer) crossing the data lines D1 to Dm, a plurality of thin film transistors TFTs formed at the crossings of the data lines D1 to Dm and the gate lines G1 to Gn, a plurality of pixel electrodes for charging liquid crystal cells with a data voltage, and a storage capacitor connected to the pixel electrodes, for maintaining a voltage of the liquid crystal cells.

Pixels of the display panel DIS are formed in a pixel area defined by the data lines D1 to Dm and the gate lines G1 to Gn, and disposed in a matrix form. The liquid crystal cell of each pixel is driven in accordance with an electric field applied by a voltage difference between the data voltage applied to the pixel electrodes and a common voltage applied to a common electrode, and adjusts the amount of transmission of incident light. The TFTs are turned on in response to a gate pulse from the gate lines G1 to Gn, and supply a voltage from the data lines D1 to Dm to the pixel electrodes of the liquid crystal cells.

Formed on the upper glass substrate of the display panel DIS area black matrix, color filters, etc. The lower substrate of the display panel DIS may be implemented in a COT (Color Filter On TFT) structure. In this case, the black matrix and the color filters may be formed on the lower substrate of the display panel DIS.

Polarizers are respectively applied to the upper glass substrate and the lower glass substrate of the display panel DIS. Alignment films for setting the pre-tilt angle of liquid crystal are then formed in the internal surfaces of the respective polarizers which face the liquid crystal. A column spacer for maintaining a cell gap of the liquid crystal cells may be formed between the upper and lower glass substrates of the display panel DIS.

A backlight unit may be disposed on the back surface of the display panel DIS. The backlight unit is implemented as an edge type or direct type backlight unit to irradiate light to the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display drive circuit comprises a data drive circuit 12, a scan drive circuit 14, and a timing controller 20, and writes video data of an input image to the pixels.

The data drive circuit 12 converts digital video data RGB input from the timing controller 20 into an analog positive/negative gamma compensation voltage to generate data voltages. The data voltages are supplied to the data lines D1 to Dm. The scan drive circuit 14 sequentially supplies gate pulses (or scan pulses) synchronized with the data voltages to the gate lines G1 to Gn to select lines of the display panel DIS to write data.

The timing controller 20 receives timing signals, such as a vertical synchronization signal Vsync, a horizontal synchronization signal Hsync, a data enable signal DE, and a main clock MCLK from an external host system. The timing controller 20 generates a scan timing control signal and a data timing control signal to control operation timings of the data drive circuit 12 and scan drive circuit 14. The scan timing control signal comprises a gate start pulse GSP, a gate shift clock, a gate output enable signal GOE, etc. The data timing control signal comprises a source sampling clock SSC, a polarity control signal POL, a source output enable signal SOE, etc.

Figure 5:
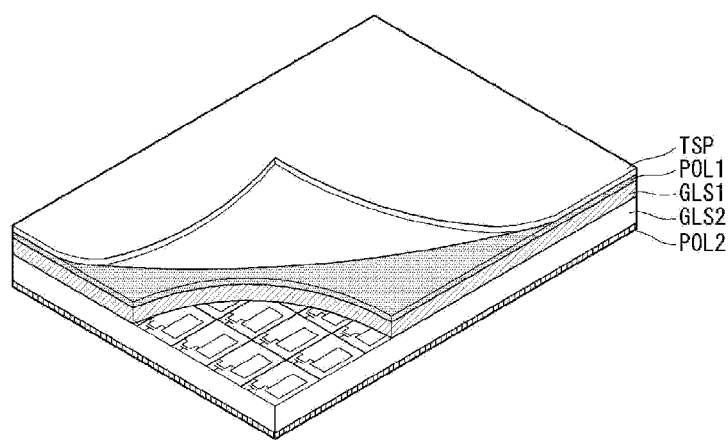
FIGS. 5 to 7 are views showing various combinations of a touch screen and a display panel.
Figure 6:
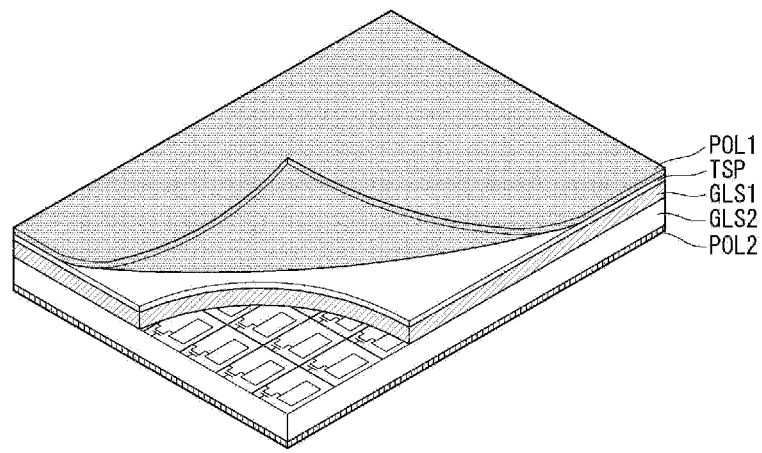
Figure 7:
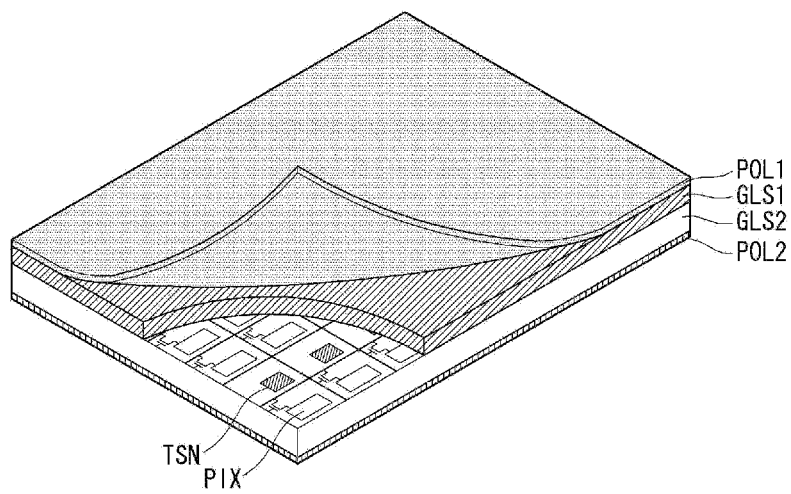

The touch screen TSP may be bonded to the upper polarizer POL1 of the display panel DIS, as shown in FIG. 5, and may be formed between the upper polarizer POL1 and the upper glass substrate GLS1, as shown in FIG. 6. Moreover, the touch sensors TSN of the touch screen TSP may be in-cell type touch sensors which are incorporated, along with the pixel array, in the lower substrate of the display panel DIS, as shown in FIG. 7. In FIGS. 5 to 7, "PIX" indicates a pixel electrode of a liquid crystal cell, "GLS2" indicates the lower substrate, and "POL" indicates the lower polarizer.

The touch screen TSP comprises Tx lines T1 to Tj (j is a positive integer less than n), Rx lines R1 to Ri (i is a positive integer less than m) crossing the tx lines T1 to Tj, and (i×j) touch sensors TSN formed between the Tx lines T1 to Tj and the Rx lines R1 to Ri.

Figure 8:
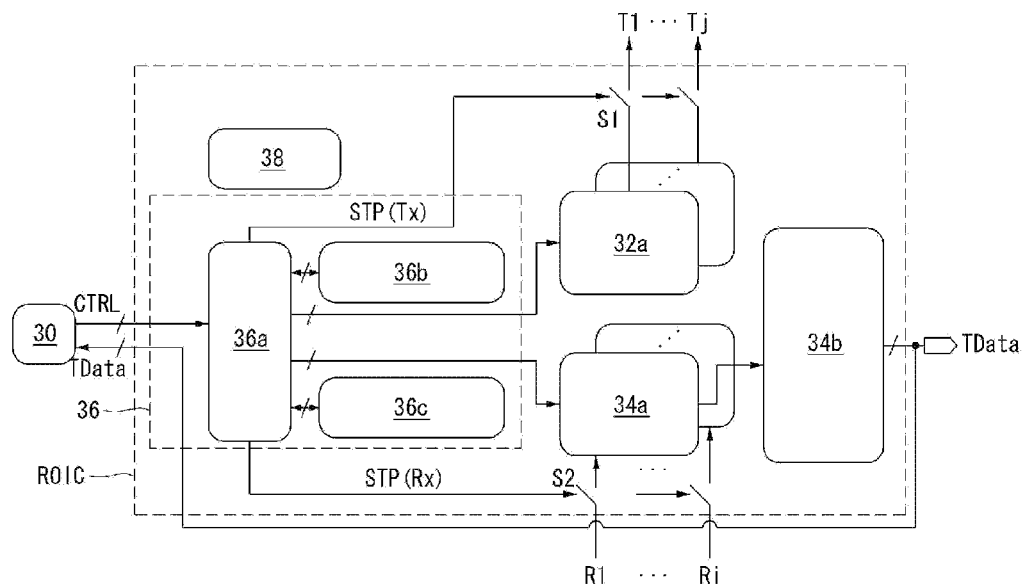
FIG. 8 is a block diagram showing in detail an ROIC of the present invention.
Figure 9:
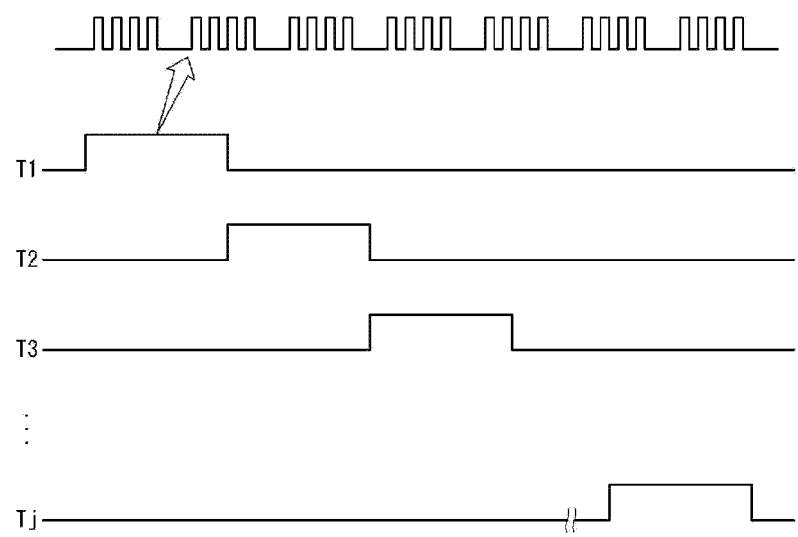
FIG. 9 is a waveform diagram showing an example of drive signals supplied to Tx lines.

The touch screen drive circuit comprises a Tx drive circuit 32, an Rx drive circuit 324, and a touch controller 30. The touch screen drive circuit supplies such a drive signal as shown in FIG. 9 to the Tx lines T1 to Tj, and senses touch sensor voltages through the Rx lines R1 to Ri in synchronization with the drive signal. As shown in FIG. 8, the Tx drive circuit 32 and the Rx drive circuit 34 may be integrated in one ROIC (Read-out IC). The touch controller 30 also may be integrated in the ROIC.

The Tx drive circuit 32 selects Tx lines to be supplied with a drive signal in response to a Tx setup signal input from the touch controller 30. Then, the Tx drive circuit 32 supplies a drive signal to the Tx lines T1 to Tj selected in response to a Tx setup signal every sensing time.

In the present invention, a voltage change of the touch sensors before and after a touch can be increased by repetitively accumulating the voltages of the touch sensors TSN N times (N is a positive integer greater than 2) to a sampling capacitor of the Rx drive circuit 34. To this end, drive signals respectively applied to the Tx lines T1 to Tj may comprise N drive signals which are generated at predetermined time intervals, as shown in FIG. 9. If j touch sensors are connected to one Tx line, N drive signals are consecutively supplied to the Tx line j times, and then drive signals are supplied to the next Tx line in the same manner.

The Rx drive circuit 34 selects Rx lines to receive touch sensor voltages in response to an Rx setup signal input from the touch controller 30. The Rx drive circuit 34 receives and samples the touch sensor voltage through the Rx lines selected in response to the Rx setup signal. The Rx drive circuit 34 converts the sampled voltage into digital data by an analog-to-digital converter to generate touch raw data TData. The touch raw data TData is transmitted to the touch controller 30.

The touch controller 30 is connected to the Tx drive circuit 32 and the Rx drive circuit 34 over an interface, such as an I²C bus, an SPI (serial peripheral interface, and a system bus. The touch controller 30 generates control signals CTRL required to control the Tx drive circuit 32 and the Rx drive circuit 34, comprising setup information (or group setup information), sampling timing information, and ADC timing information.

The touch controller 30 analyzes the touch raw data input from the Rx drive circuit 34 by a preset touch detection algorithm. In the touch detection algorithm, touch raw data is compared with a predetermined threshold value, and if the touch raw data is larger than the threshold value, the touch raw data is detected as data of a touch (or approach) input position, and the coordinates of the touch (or approach) input position are calculated. The touch detection algorithm may be any well-known algorithm. The touch controller 30 transmits coordinate data HIDxy, comprising coordinate information of a touch (or approach) input position obtained as a calculation result of the touch detection algorithm, to an external host system. The touch controller 30 may comprise a buffer memory that stores a calculation result of the touch detection algorithm and touch coordinate data.

Figure 10:
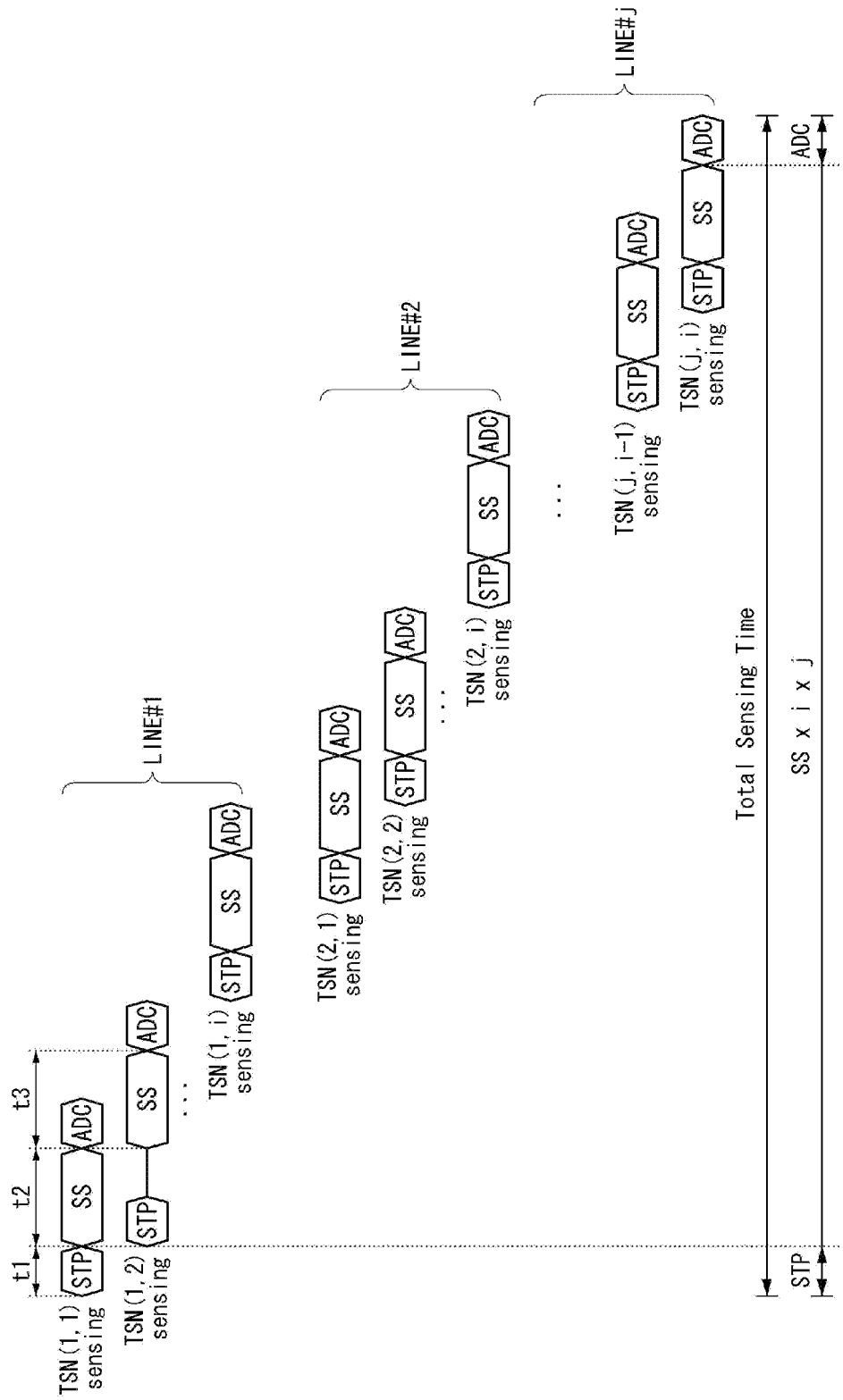
FIGS. 10 to 12 are views showing a driving method of a touch screen apparatus according to a first exemplary embodiment of the present invention.
Figure 11A:
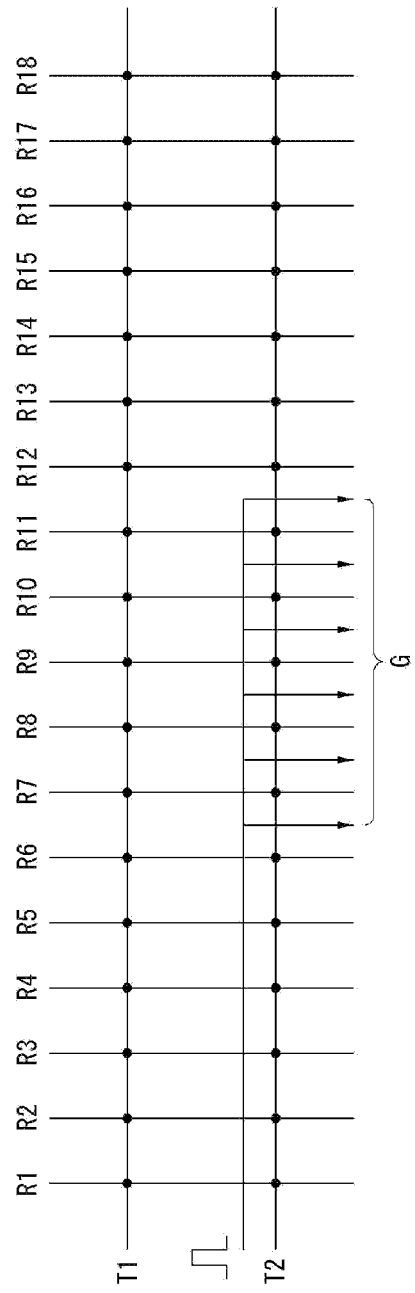
Figure 11B:
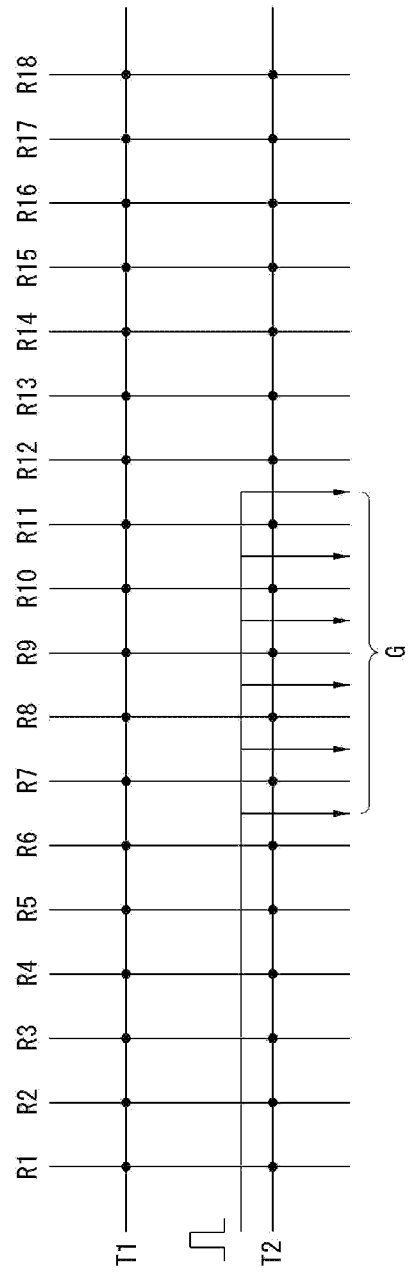
Figure 11C:
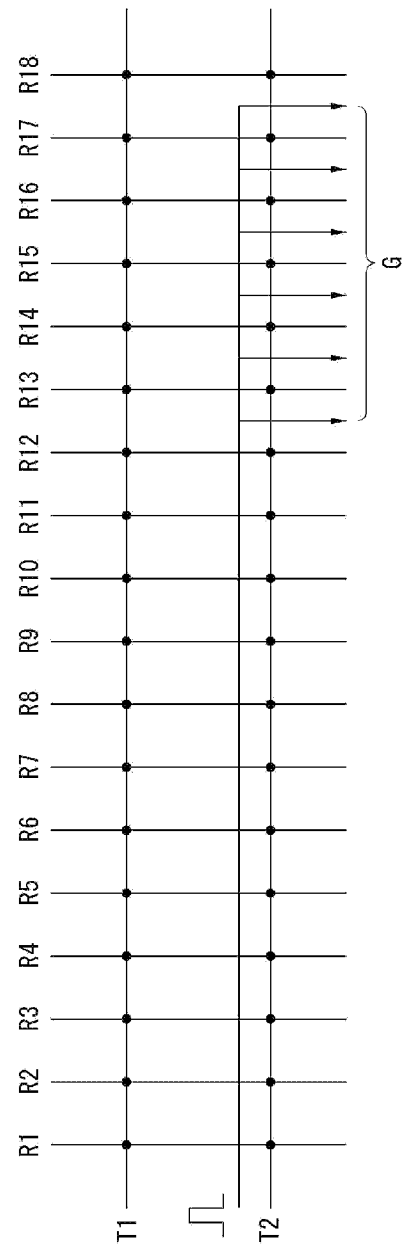
Figure 12:
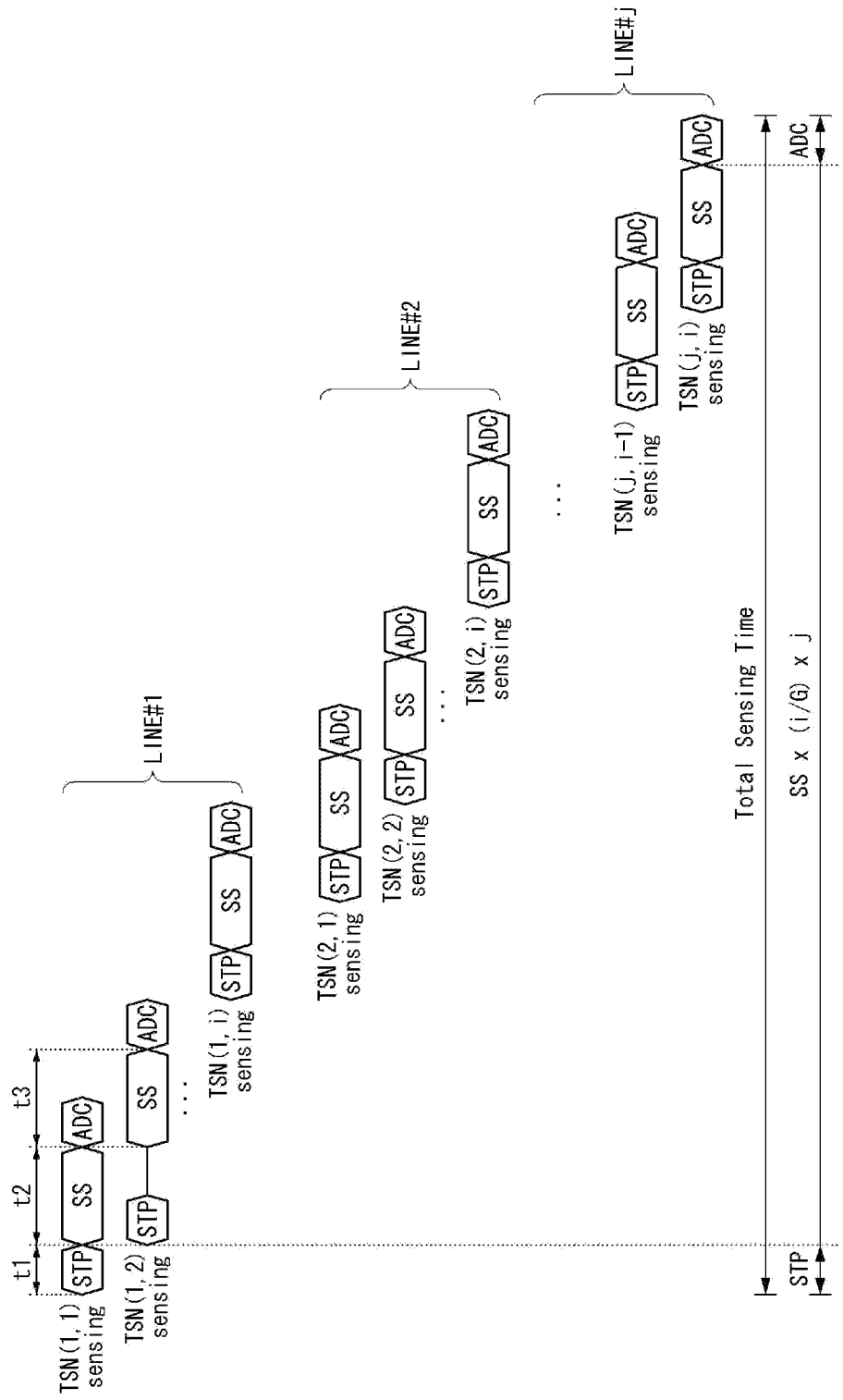

The touch screen drive circuit performs the setup operation and the sensing operation in parallel, or performs the sensing operation and the ADC operation in parallel, or performs the setup operation, the sensing operation, and the ADC operation in parallel, as shown in FIGS. 10 to 12, in order to reduce the sensing time of each of the touch sensors of the touch screen. Accordingly, the touch screen drive circuit simultaneously processes the sensing operation and the ADC operation, as well as the setup operation, within a setup time. To this end, the touch controller 30 may generate a setup signal and/or an ADC clock during a sensing time. The touch controller 30 may be implemented as an MCU (Micro Controller Unit).

The host system may be connected to an external video source, for example, a navigation system, a set-top box, a DVD player, a Blu-ray player, a personal computer (PC), a home theater system, a broadcast receiver, and a phone system, and receive image data from the external video source. The host system converts the image data from the external video source into a format suitable for displaying on the display panel DIS. Also, the host system executes an application program associated with the coordinate data input from the touch controller 30.

FIG. 8 is a block diagram showing in detail an ROIC of the present invention.

Referring to FIG. 8, the ROIC comprises a Tx drive circuit 32, an Rx drive circuit 34, an ROIC controller 36, and a clock generator 38.

The Tx drive circuit 32 comprises a Tx drive signal generator 32a and Tx setup switches S1. The Rx drive circuit 34 comprises a sampler 34a, an analog-to-digital converter 34b, and Rx setup switches S2.

The ROIC controller 36 comprises a command processor 36a, a first buffer memory 36b, and a second memory 36c. The buffer memories 36b and 36c operate as FIFO (first-in first-out) memories.

The command processor 36a decodes a control signal CTRL received from the touch controller 30 to extract setup information, sampling timing information, and ADC timing information. The buffer memories 36b and 36c may temporarily store the setup information, sampling information, and ADC timing information. The command processor 36a generates setup signals STP(Tx) and STP(Rx) for selecting a Tx line and an Rx line based on the setup information. The command processor 36a controls operation timings of the touch sensor voltage sampler 34a and the analog-to-digital converter 34b based on the sampling timing information and the ADC timing information.

The Tx drive signal generator 32a generates a drive signal under the control of the command processor 36a. The Tx setup switches S1 are connected between the Tx drive signal generator 32a and the Tx lines T1 to Tj. The Tx setup switches S1 are turned on in response to the Tx setup signal STP(Tx) to connect Tx lines to be supplied with the drive signal to an output terminal of the Tx drive signal generator 32a.

The touch sensor voltage sampler 34a samples a touch sensor voltage received through the Rx lines R1 to Ri under the control of the command processor 36a. The Rx setup switches S2 are connected between the touch sensor voltage sampler 34a and the Rx lines R1 to Ri. The Rx setup switches S2 are turned on in response to the Rx setup signal input from the command processor 36a to connect Rx lines for receiving touch sensor voltages to an input terminal of the touch sensor voltage sampler 34a.

The analog-to-digital converter 34b converts the sampled touch sensor voltage into touch raw data TDATA, which is digital data, under the control of the command processor 36a.

The clock generator 38 transmits a clock signal to the Tx drive signal generator 32a, the touch sensor voltage sampler 34a, and the analog-to-digital converter 34b under the control of the ROIC controller 36, and synchronizes operation timings of the Tx drive circuit 32 and the Rx drive circuit 34.

FIGS. 10 to 12 are views showing a driving method of a touch screen apparatus according to a first exemplary embodiment of the present invention.

Referring to FIGS. 10 to 12, the touch controller 30 generates setup signals STP(TX) and STP(RX) for selecting an (I+1)th touch sensor during the sensing time of an I-th sensor (I is a positive integer). Also, the touch controller 30 generates an ADC clock ADC for converting a voltage of the (I−1)th touch sensor during the sensing time of the I-th touch sensor. The Tx setup signal STP(TX) is transmitted to the Tx drive circuit 32. The Rx setup signal STP(RX) and the ADC clock ADC are transmitted to the Rx drive circuit 34.

The touch controller 30 generates a first Tx setup signal in the Tx drive circuit 32 during time t1 in order to sense a voltage of the first touch sensor TSN(1,1) of a first line LINE#1. The Tx drive circuit 32 selects a first Tx line T1 in response to the first Tx setup signal. The first Tx line T1 is connected to the first to i-th touch sensors TSN(1,1)~TSN(1,i).

The touch controller 30 generates a second Tx setup signal for selecting the second touch sensor TSN(1,2) within time t2, and outputs a switch control signal of a sampling circuit. The Tx drive circuit 32 supplies a drive signal to the first Tx line T1 within time t2 (sensing time). Also, the Tx drive circuit 32 re-selects the first Tx line T1 in response to the second Tx setup signal STP within time t2 (sensing time). The Rx drive circuit 34 selects the first Rx line R1 for receiving a touch sensor voltage in response to a first Rx setup signal during time t2. The Rx drive circuit 34 stores a voltage of the first touch sensor, received through the first Rx line R1 in synchronization with the drive signal during time t2, in the sampling capacitor, and samples it. The first touch sensor TSN(1,1), (i+1)th touch sensor TSN(2,1), . . . , ((j−2)+1)th touch sensor TSN((j−1), 1), ((j−1)+1)th touch sensor TSN(j,1), which are disposed along the first column line, are connected to the first Rx line R1.

The touch controller 30 outputs an ADC clock ADC within time t3, and generates a third Tx setup signal (not shown) for selecting the third touch sensor TSN(1,3). The Tx drive circuit 32 supplies a drive signal set in accordance with the second Tx setup signal to the first Tx line T1 within time t3, and re-selects the first Tx line T1 in response to a third setup signal. The Rx drive circuit 34 inputs the sampled voltage of the first touch sensor during time t3 into the analog-to-digital converter, and converts the voltage of the first touch sensor into digital data.

By repeating this operation, voltages of all the touch sensors TSN(1,1)-TSN(1,i) of the first line LINE#1 are sequentially sampled, and converted into digital data. During the sensing time of the i-th touch sensor TSN(1,i), which is the last touch sensor of the first line LINE#1, the Tx drive circuit 32 supplies a drive signal to the first Tx line T1, and the Rx drive circuit 34 samples a voltage of the i-th touch sensor TSN(1,i) received through the i-th Rx line Ri. During the sensing time of the i-th touch sensor TSN(1,i), the touch controller 30 outputs setup signals for selecting the (i+1)th touch sensor TSN(2,i), which is the first touch sensor of a second line LINE#2.

The touch screen of the present invention makes it possible to significantly reduce the sensing time of the touch sensors TSN(1,i)~TSN(j,i) by performing at least two operations among the sensing operation, the setup operation, and the ADC operation in parallel, that is, by simultaneously performing them. Moreover, the present invention can cope with the high resolution of the touch screen by an increased number of touch sensors of the touch screen because a higher touch report rate can be achieved. In the parallel execution method shown in FIG. 10, the total sensing time is equal to "total sensing time=STP+{SS×i×j}+analog-to-digital conversion time (ADC)".

The touch screen is electrically coupled to the display panel DIS. Accordingly, noise may be introduced into a touch sensor voltage received from the touch sensors of the touch screen during sensing time due to an effect of a drive signal from the display panel DIS. When the total sensing time of the touch screen is reduced as shown in FIG. 10, the time of noise entry into the touch sensors can be reduced, thereby reducing noise exerting an adverse effect on the touch screen.

In the present invention, the total sensing time of the touch screen TSP can be further reduced by simultaneously sensing a plurality of touch sensors connected to Tx lines. To this end, the touch controller 30 generates a group Rx setup signal. The Rx drive circuit 34 simultaneously selects G (G is a positive integer greater than 2 and less than i/2) Rx lines for receiving touch sensor voltages in response to the group Rx setup signal from the touch controller 30. Accordingly, when a drive signal is input into the Tx lines in response to the group Rx setup signal, the Rx drive circuit 34 simultaneously receives G touch sensor voltages through the G Rx lines and samples them, and then simultaneously selects the next G Rx lines in response to the next group Rx setup signal. Although G is illustrated as 6 in FIGS. 11a to 11b, G is not limited thereto.

FIGS. 11a to 11c are views showing an example of simultaneously sensing of voltages of touch sensors simultaneously received through a plurality of Rx lines. FIG. 12 is a view showing a signal sequence when a plurality of touch sensors are simultaneously sensed as shown in FIGS. 11a to 11c.

Referring to FIGS. 11a to 12, when a drive signal is applied to the second Tx line, the Rx drive circuit 34 simultaneously senses voltages of 6 touch sensors connected to the second Tx line. Next, when the drive signal is re-applied to the second Tx line, the Rx drive circuit 34 simultaneously senses voltages of the next 6 touch sensors. In this case, the total sensing time of the touch screen TSP is further reduced to "total sensing time=STP+{SS×i/G×j}+analog-to-digital conversion time (ADC)"

In the present invention, the total sensing time of the touch screen can be reduced by performing at least two operations among the sensing operation, the setup operation, and the ADC operation, as in the previous embodiment. Further, in a second exemplary embodiment of the present invention, the total sensing time of the touch screen can be further reduced by reducing the number of setup signal transmissions based on group setup information, as shown in FIGS. 13 to 18.

Figure 14:
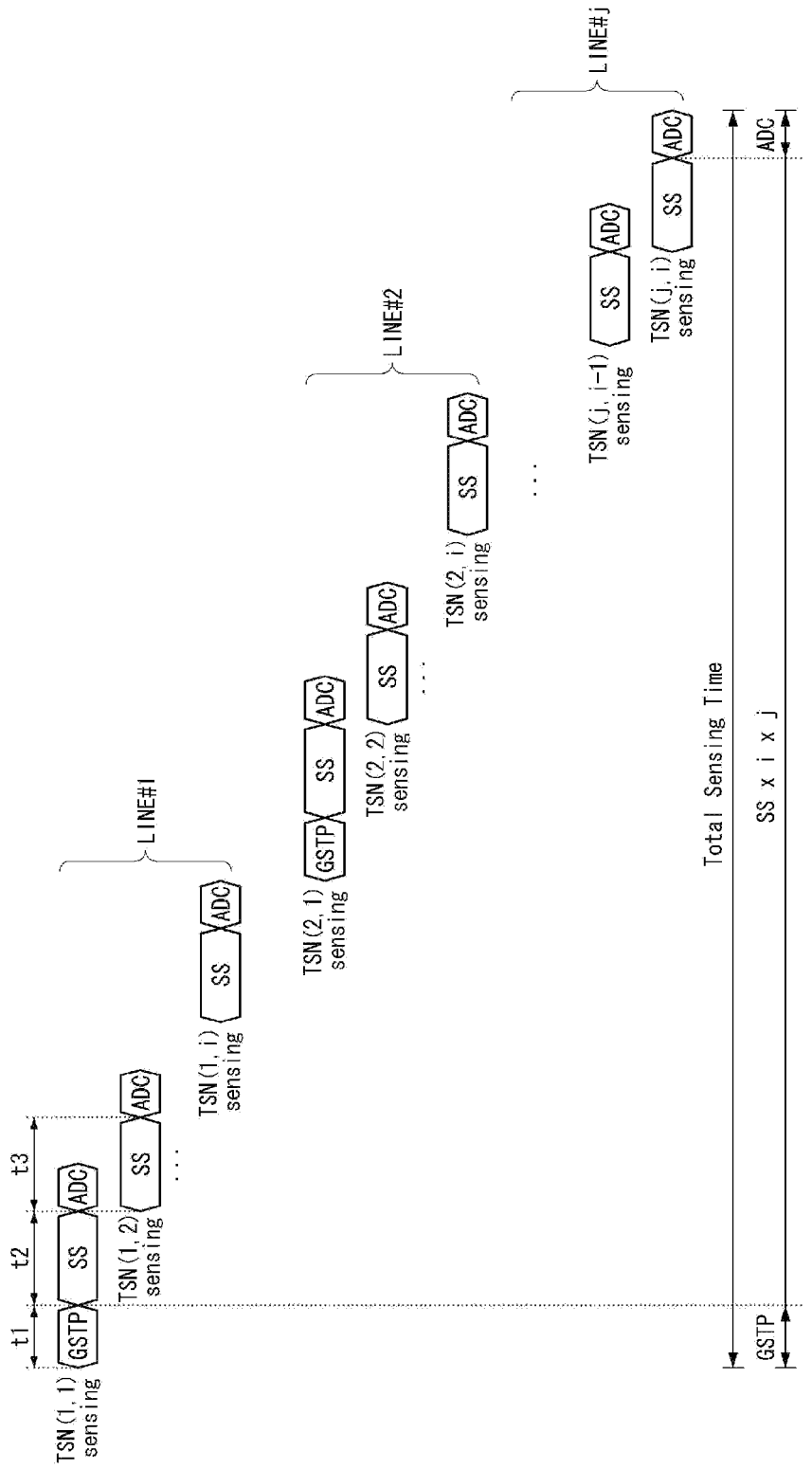
Figure 15:
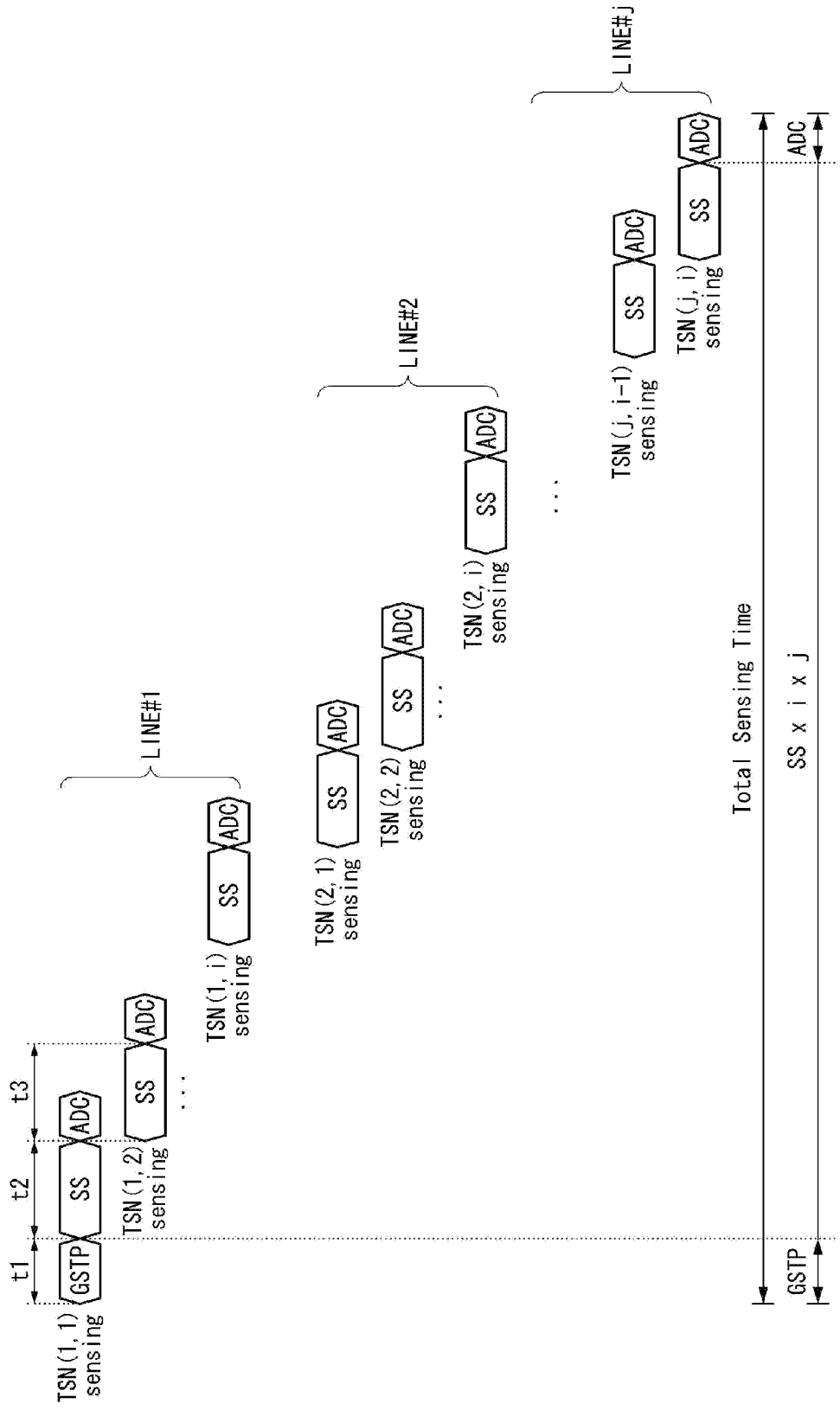

The touch controller 30 may generate a control signal CTRL containing group setup information, sampling timing information, and ADC timing information. The group setup information comprises a plurality of Tx setup information and a plurality of Rx setup information which are required to sense voltages of touch sensors in a group having a preset size on the touch screen TSP. Upon receipt of group setup information, the ROIC selects Tx lines and Rx lines connected to a plurality of touch sensors based on the group setup information. The Tx setup information and Rx setup information, as explained in the previous embodiment, are single setup information that is transmitted to the ROIC each time a touch sensor is sensed. In contrast, the group setup information comprises a plurality of setup information for selecting the Tx lines and Rx lines connected to the touch sensors in the preset group, and is generated once at an initial stage within the time required to sense the touch sensors in the group. The group setup information is transmitted to the ROIC once at an initial stage of the time required to sense the touch sensors in the group. As used herein, the group may be set to have a size enough to comprise a plurality of touch sensors. For example, the group may be a group for each line, comprising the touch sensors connected to one Tx line on the touch screen, as shown in FIG. 14, and may be set to have a size enough to comprise all the touch sensors present on the touch screen, as shown in FIG. 15. It is to be noted that the group is not limited thereto. For example, the group may comprise touch sensors connected to N (N is a positive integer greater than 2) lines.

An ROIC which implements the driving method of the touch screen apparatus according to the second exemplary embodiment of the present invention will be explained in FIG. 8.

In FIG. 8, the ROIC controller 36 receives a control signal CTRL from the touch controller 30, decodes the control signal CTRL, and stores group setup information, sampling timing information, and ADC timing information in the buffer memories 36b and 36c.

Tx setup information of the group setup information may be stored in the first buffer memory 36b, and Rx setup information of the group setup information may be stored in the second buffer memory 36c.

The command processor 36a generates Tx setup signals and Rx setup signals by reading the Tx setup information and Rx setup information of the group setup information from the buffer memories 36b and 36c by incrementing the address count of the buffer memories 36a and 36b by 1 until the sensing of all the touch sensors in the corresponding group is completed. Accordingly, according to the driving method of the touch screen according to the second exemplary embodiment, the number of times that the touch screen drive circuit receives a setup signal can be reduced by performing as many setup operations as the number of touch sensors in the group in parallel based on received group setup information.

FIGS. 13 to 18 are views showing the driving method of the touch screen apparatus according to the second exemplary embodiment of the present invention.

Figure 13:
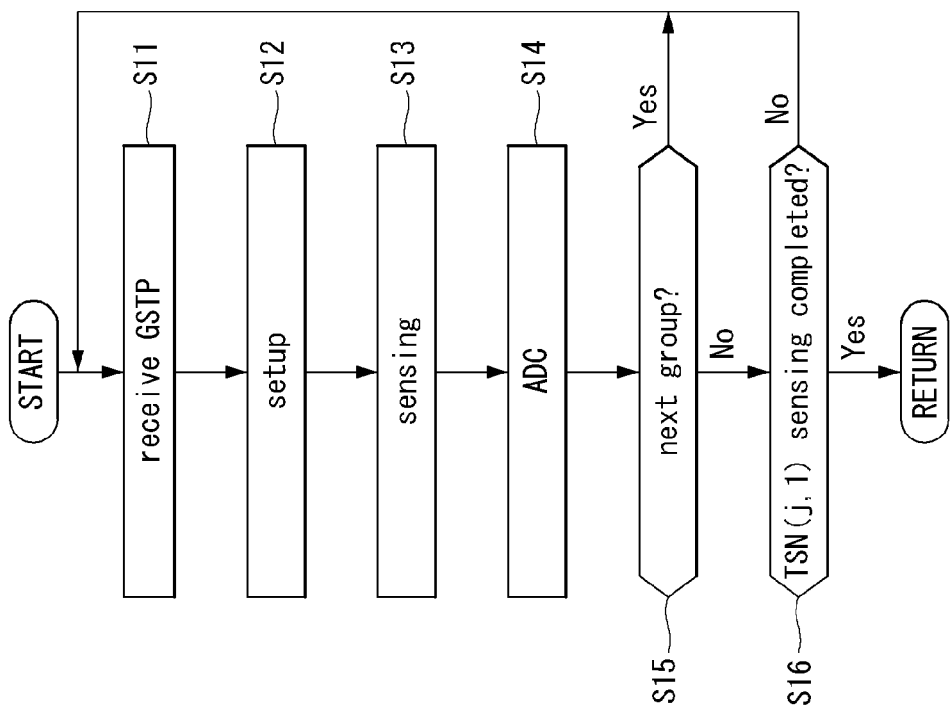

Referring to FIG. 13, the ROIC controller 36 receives group setup information GSTP from the touch controller 30 and stores it in the buffer memories 36b and 36c (S11). Next, the ROIC controller 36 repetitively selects Tx lines and Rx lines based on the group setup information GSTP, until voltages of all touch sensors present in one group have been sensed, senses and samples the voltages of the touch sensors, and converts the sampled touch sensor voltages into digital data (S12 to S14). The ROIC controller 36 completes the sensing operation of all the touch sensors present in the current group by repeating the steps S12 to S14 (S15 and S16).

The group setup information GSTP may comprise Tx and Rx channel setup information for touch sensors arranged in 1 line of the touch screen TSP. The group setup information GSTP is transmitted to the ROIC controller 36 once during 1 line sensing time of the touch screen TSP, as shown in FIG. 14.

Referring to FIG. 14, the touch controller 30 transmits the group setup information GSTP to the ROIC controller 36. The group setup information GSTP comprises Tx channel information and Rx channel information required to sense the touch sensors present in 1 line. The touch controller 30 may output an ADC clock ADC for converting a voltage of the (I−1)th touch sensor into digital data during the sensing time of the I-th (I is a positive integer) touch sensor, in the same manner as the above-described first exemplary embodiment, to control the sensing operation and the ADC operation in parallel.

The touch controller 30 transmits group setup information GSTP of a first line to the ROIC controller 36 during time t1. The ROIC controller 36 receives the group setup information GSTP of the first line during time t1, and selects Tx lines and Rx lines, indicated by the group setup information GSTP of the first line, based on the group setup information GSTP of the first line. Next, the ROIC controller 36 senses all the touch sensors in a group selected based on the group setup information GSTP by repeating the sensing operation and the ADC operation. The group setup information GSTP of the first line comprises Tx channel information and Rx channel information required to sense voltages of all the touch sensors in the first line LINE#1. The ROIC controller 36 controls the Tx drive circuit 32 and the Rx drive circuit 34 during time t2 and time t3 to sense a voltage of the first touch sensor TSN (1,1), sample the voltage, and convert it into digital data. after completing the sensing of the first touch sensor TSN(1,1).

For example, after completion of the sensing of the first touch sensor TSN(1,1), the ROIC controller 36 selects the first Tx line T1 and the second Rx line R2, indicated by the received group setup information, and senses the second touch sensor TSN(1,2). Next, after completion of the sensing of the second touch sensor TSN(1,2), the ROIC controller 36 selects the first TX line T1 and the third Rx line R3, indicated by the received group setup information, and sense the third touch sensor TSN(1,3). Next, after completion of the sensing of the third touch sensor TSN(1,3), the ROIC controller 36 selects the first Tx line T1 and the fourth Rx line R4, indicated by the received group setup information, and senses the fourth touch sensor TSN(1,4).

After completion of the sensing SS and ADC conversion of all the touch sensors of the first line LINE#1, the touch controller 30 transmits group setup information GSTP of the second line to the ROIC controller 36. The group setup information GSTP of the second line comprises Tx channel information and Rx channel information required to sense voltages of all the touch sensors in the second line LINE#2. The ROIC controller 36 selects Tx lines and Rx lines connected to the touch sensors of the second line based on the received group setup information until the sensing of all the touch sensors of the second line LINE#2 is completed.

For example, after completion of the sensing of the i-th touch sensor TSN(1,i), the ROIC controller 36 selects the second Tx line T2 and the first Rx line R1, indicated by the received group setup information, and senses the (i+1)th touch sensor TSN(2,1). Next, after completion of the sensing of the (i+1)th touch sensor TSN(2,1), the ROIC controller 36 selects the second TX line T2 and the second Rx line R2, indicated by the received group setup information, and sense the (i+2)th touch sensor TSN(2,2). Next, after completion of the sensing of the (i+2)th touch sensor TSN(2,2), the ROIC controller 36 selects the second Tx line T2 and the third Rx line R3, indicated by the received group setup information, and senses the (i+3)th touch sensor TSN(2,3).

The group setup information GSTP may comprise Tx and Rx channel setup information for all the touch sensors of the touch screen TSP. The group setup information GSTP is transmitted to the ROIC once during 1 line sensing time of the touch screen TSP, as shown in FIG. 13.

Referring to FIG. 13, the touch controller 30 transmits the group setup information GSTP to the ROIC controller 36, and then controls the setup operation of Tx lines and Rx lines connected to all touch sensors based on the group setup information GSTP. The group setup information GSTP comprises Tx channel information and Rx channel information required to sense all the touch sensors present of the touch screen.

The touch controller 30 may output an ADC clock ADC for converting a voltage of the (I−1)th touch sensor into digital data during the sensing time of the I-th touch sensor, in the same manner as the above-described first exemplary embodiment, to control the sensing operation and the ADC operation in parallel.

The ROIC controller 36 receives group setup information GSTP during time t1, and selects Tx lines and Rx lines based on the group setup information GSTP. The ROIC controller 36 selects Tx lines and Rx lines based on the received group setup information during time t1, and sequentially senses all the touch sensors TSN(1,1)~TSN(j,i) in the touch screen. The ROIC controller 36 senses all the touch sensors TSN(1,1)~TSN(j,i) of the touch screen during frame period, and then receives the next group setup information from the touch controller 30 at an initial stage of the next frame period and senses the touch sensors TSN(1,1)~TSN(j,i) of the touch screen again.

In the present invention, by making use of group setup information, the transmission time of a setup signal transmitted from the touch controller 30 to the ROIC can be reduced a lot, and the total sensing time required to sense all the touch sensors TSN(1,i)~TSN(j,i) by performing the sensing process and the ADC process in parallel can be reduced a lot, as compared to the conventional art.

For example, as shown in FIG. 14, in the case that group setup information GSTP is generated line by line, and an Rx channel is selected for each touch sensor to sense a touch sensor, the total sensing time is equal to "total sensing time=(GSTP+(SS×i)+ADC)×j". As shown in FIG. 15, in the case that group setup information GSTP is generated frame by frame (or for each touch screen corresponding to one entire screen), and an Rx channel is selected for each touch sensor to sense a touch sensor, the total sensing time is equal to "total sensing time=GSTP+(SS×i×j)+ADC". As used herein, "GSTP" refers to the time required to receive group setup information GSTP from the touch controller GSTP and process the setup operation of Tx and Rx channels for all the touch sensors in the group based on the group setup information GSTP. "SS" refers to the time required for the sensing operation, and "ADC" refers to the time required for the ADC operation.

In the present invention, the total sensing time of the touch screen TSP can be further reduced by simultaneously sensing a plurality of touch sensors connected to the same Tx line. For example, the touch controller 30 may use the group setup information GSTP to drive the Rx lines R1 to Ri separately in G Rx groups, as shown in FIGS. 11 and 11c. In this case, the Rx drive circuit 34 sequentially activates the G Rx groups based on the group setup information GSTP from the touch controller 30, and simultaneously activates Rx channels connected to Rx lines present in one group, thereby simultaneously receiving touch sensor voltages through the Rx lines present in the group.

Figure 16:
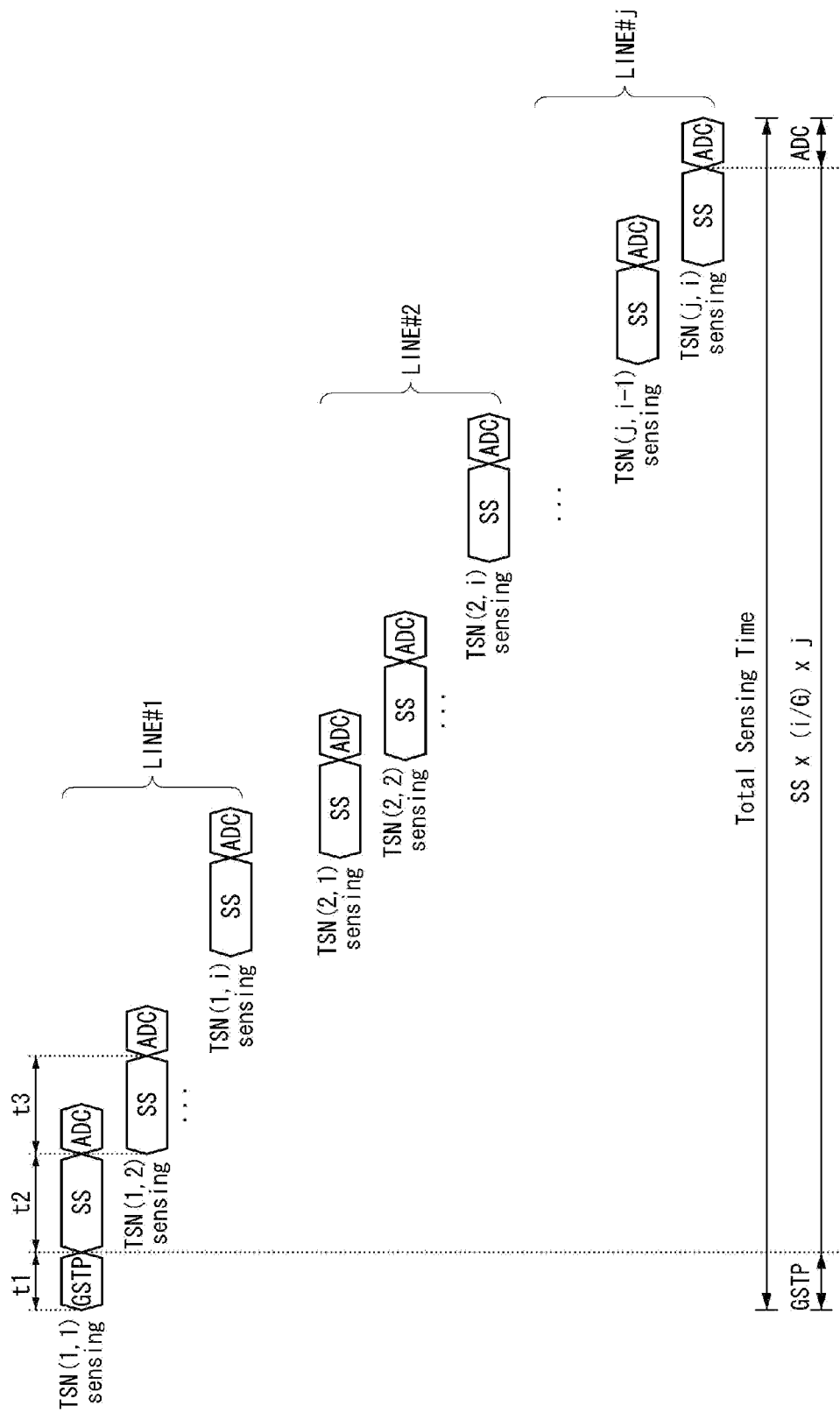

A method of simultaneously setting up G Rx channels and simultaneously receiving G touch sensor voltages may be applied to both an embodiment for generating group setup information GSTP line by line, as shown in FIG. 14, and an embodiment for generating group setup information GSTP frame by frame, as shown in FIG. 15. FIG. 16 shows an example of generating group setup information GSTP frame by frame and simultaneously selecting G Rx channels, as shown in FIG. 15.

Figure 17:
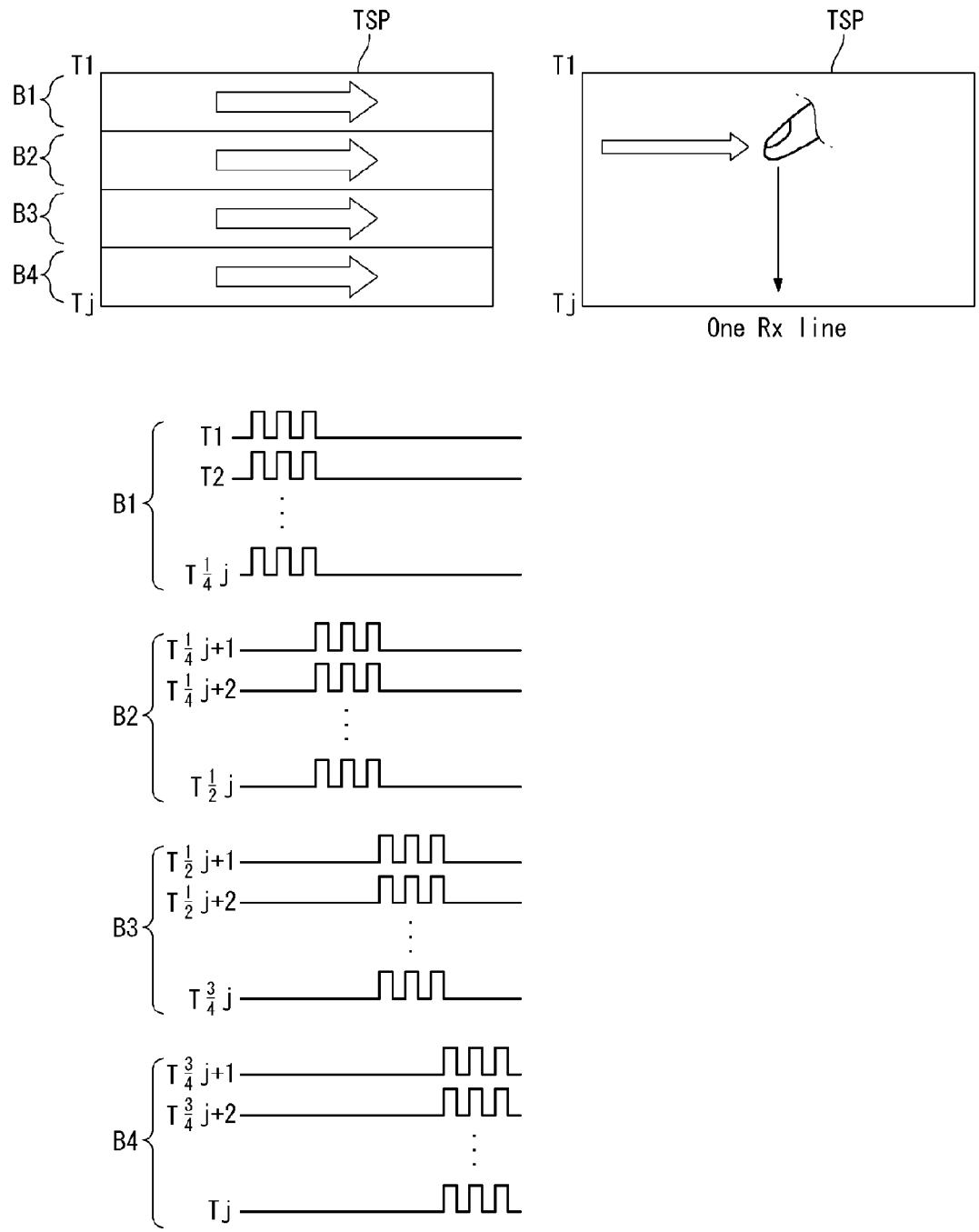

The Tx lines T1 to Tj to which a drive signal is applied may be driven separately in K groups (K is a positive integer greater than 2 and less than j/2) based on the group setup information GSTP. For example, as shown in FIG. 17, Tx channels may be divided into four Tx groups B1 to B4, and a drive signal may be simultaneously applied to Tx lines present in one Tx group. In this case, if a touch sensor voltage is received through an Rx channel selected for each touch sensor, the total sensing time may be further reduced to "total sensing time=(GSTP+(SS×i)+ADC)×j/K".

The Tx lines T1 to Tj to which a drive signal is applied may be driven separately in K groups based on the group setup information GSTP, and a drive signal may be simultaneously supplied to Tx lines present in one group. In this case, if the Rx lines R1 to Ri for receiving touch sensor voltages are driven separately in G Rx groups, as shown in FIGS. 11a to 11c, and the touch sensor voltages are simultaneously received through the Rx lines present in the Rx group, the total sensing time may be further reduced to "total sensing time=(GSTP+(SS×i/G)+ADC)×j/K"

Figure 35:
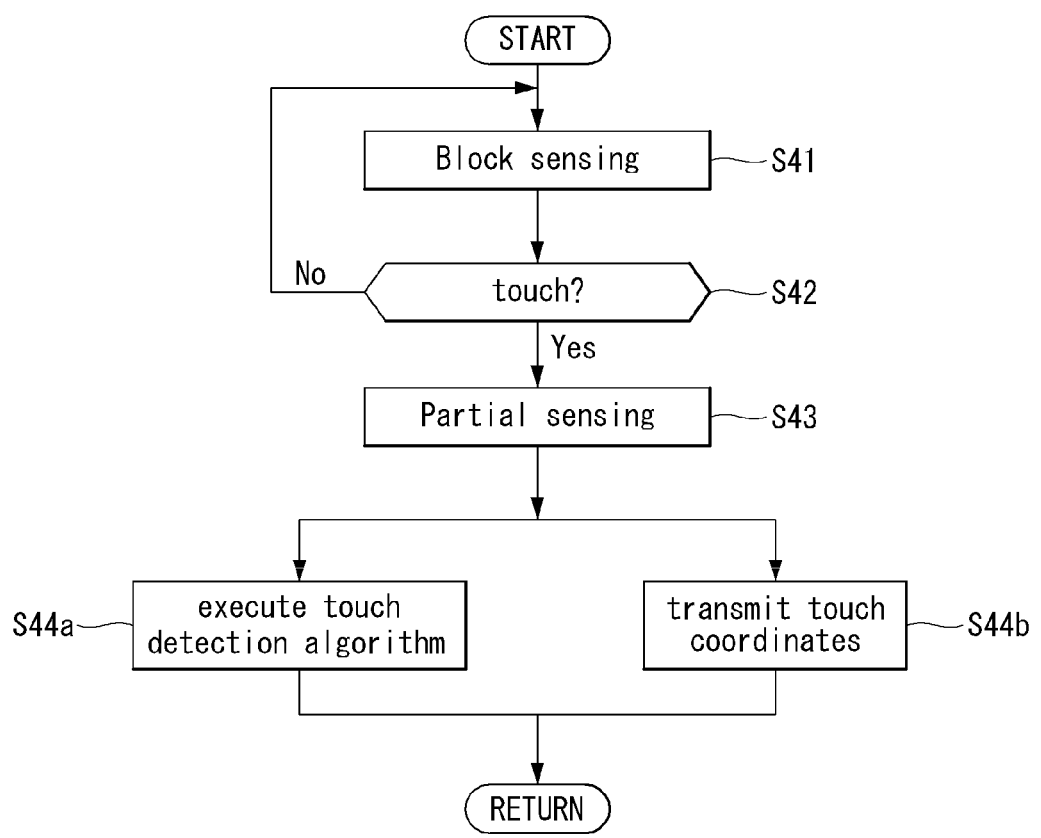
FIG. 35 is a flowchart showing a driving method of a touch screen apparatus according to a fourth exemplary embodiment of the present invention.

The present invention can reduce to the total sensing time of the touch screen by the parallel processing described in the previous embodiments. Further, the present invention can reduce the time required to execute the touch detection algorithm and transmit touch coordinate data by applying the previous embodiments, and performing the execution of the touch detection algorithm and the data transmission operation of transmitting touch coordinates to the host system, as shown in FIGS. 19 and 35.

Figure 19:
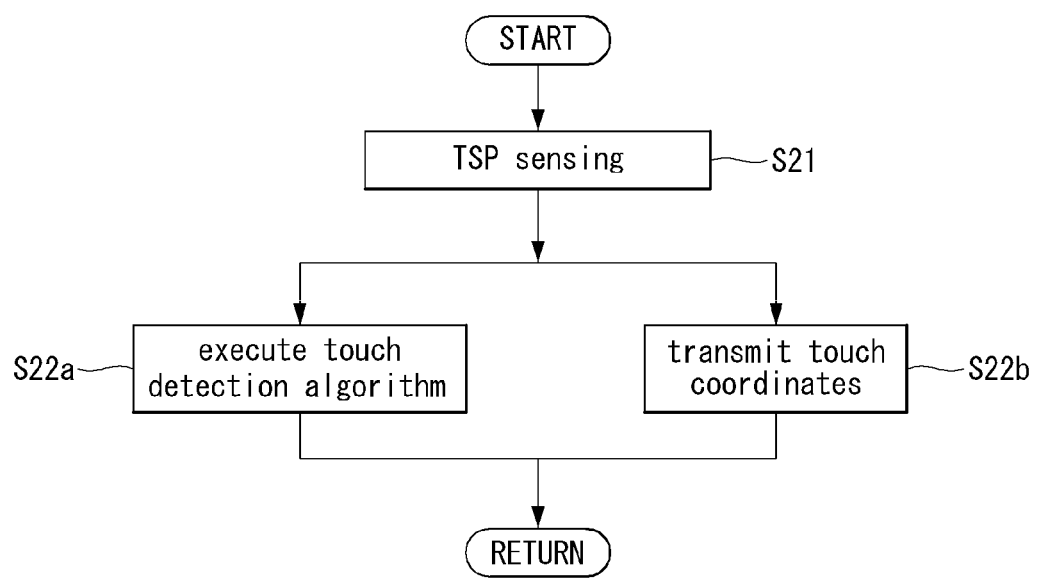
FIG. 19 is a view showing a driving method of a touch screen apparatus according to a third exemplary embodiment of the present invention.

FIG. 19 is a flowchart showing a driving method of a touch screen apparatus according to a third exemplary embodiment of the present invention.

Referring to FIG. 19, in the driving method of the touch screen apparatus, the touch sensors of the touch screen TSP are sensed to obtain touch raw TData (S21). Although a sensing method of the touch screen TSP may be a conventional sensing method, it is preferred to apply a sensing method for significantly reducing total sensing time according to the first and second exemplary embodiments. The sensing method of the touch screen TSP may be a block sensing method or partial sensing method shown in FIGS. 20 to 25.

Next, in the driving method of the touch screen apparatus, the touch detection algorithm is executed to analyze touch raw data, detect the touch raw data as data of a touch (or approach) input position if the touch raw data is larger than a threshold value, and calculate the coordinates (S22a). At the same time, in the driving method of the touch screen apparatus, touch coordinate data, obtained as an execution result of the touch recognition algorithm, is transmitted to a host system (S22b).

The touch controller 30 may execute the touch detection algorithm to calculate the coordinates of a touch (or approach) input position for each line or frame of the touch screen. For example, in the step S22a, the touch controller 30 analyzes touch raw data TData obtained from an I-th line of the touch screen TSP, calculates the coordinates of a touch (or approach) input of the I-th line, and stores touch coordinate data containing the coordinates in a buffer memory. At the same time, in the step S22b, the touch controller 30 reads out touch coordinate data of an (I−1)-th line from the buffer memory and transmits it to an external host system.

Moreover, the touch controller 30 may transmit the touch coordinate data, obtained as an execution result of the touch detection algorithm, to the host system for each line or frame of the touch screen. The touch controller 30 may comprise a buffer memory temporarily storing the touch coordinate data containing the coordinates. For example, in the step S22a, the touch controller 30 analyzes touch raw data TData corresponding to 1 frame, obtained from all the touch sensors of the touch screen TSP, calculates the coordinates of a touch (or approach) input of an I-th frame, and stores touch coordinate data containing the coordinates in a buffer memory. At the same time, in the step S22b, the touch controller 30 reads out touch coordinate data of an (I−1)-th frame from the buffer memory and transmits it to an external host system.

In the touch screen sensing method of the present invention, as shown in FIGS. 20 to 35, the presence or absence of a touch (or approach) input can be quickly determined on a per-block basis by virtually dividing the touch screen into a plurality of blocks and making use of the block sensing method. Next, in the touch screen sensing method of the present invention, the partial sensing method is applied only to a block from which a touch (or approach) input is detected so that a touch input position can be precisely sensed within the block and the total sensing time of the touch screen can be further reduced. The block sensing process and the partial sensing process may be applied along with the previous first to third exemplary embodiments. For example, in the block sensing process and the partial sensing process, respectively, the sensing operation and/or the ADC operation may be performed in parallel with the setup operation. Alternatively, the group setup operation may be performed, and then the sensing operation and the ADC operation may be performed in parallel. Moreover, in the blocking sensing process and the partial sensing process, respectively, the execution of the touch detection algorithm and the transmission of touch data may be performed in parallel.

Hereinbelow, a driving method of the touch screen apparatus using the block sensing process and the partial sensing process will be described in conjunction with FIGS. 20 to 35.

The touch screen TSP is divided into virtual Tx/Rx blocks along an x-axis direction and/or a y-axis direction, and each of the blocks comprises a plurality of Tx lines, a plurality of Rx lines, and a plurality of touch sensors.

As shown in FIGS. 20 to 34, the touch screen drive circuit performs block sensing (or first sensing) of touch sensors on a per-block basis, and then performs partial sensing (or second sensing) of touch sensors within a block from which a touch (or approach) input is detected, whereby a precise touch position is detected. A first sensing time is only the sensing time of 1 line in the conventional art. Accordingly, the touch screen apparatus of the present invention can achieve a reduction in the total sensing time required to sense all the touch sensors in the touch screen and a reduction in data obtained from the touch sensors by the reduced total sensing time. Moreover, the touch screen is sensed two times for each frame by using the block sensing process and the partial sensing process, thereby improving the accuracy of a touch sensing result and the sensitivity of the touch sensors.

Figure 26:
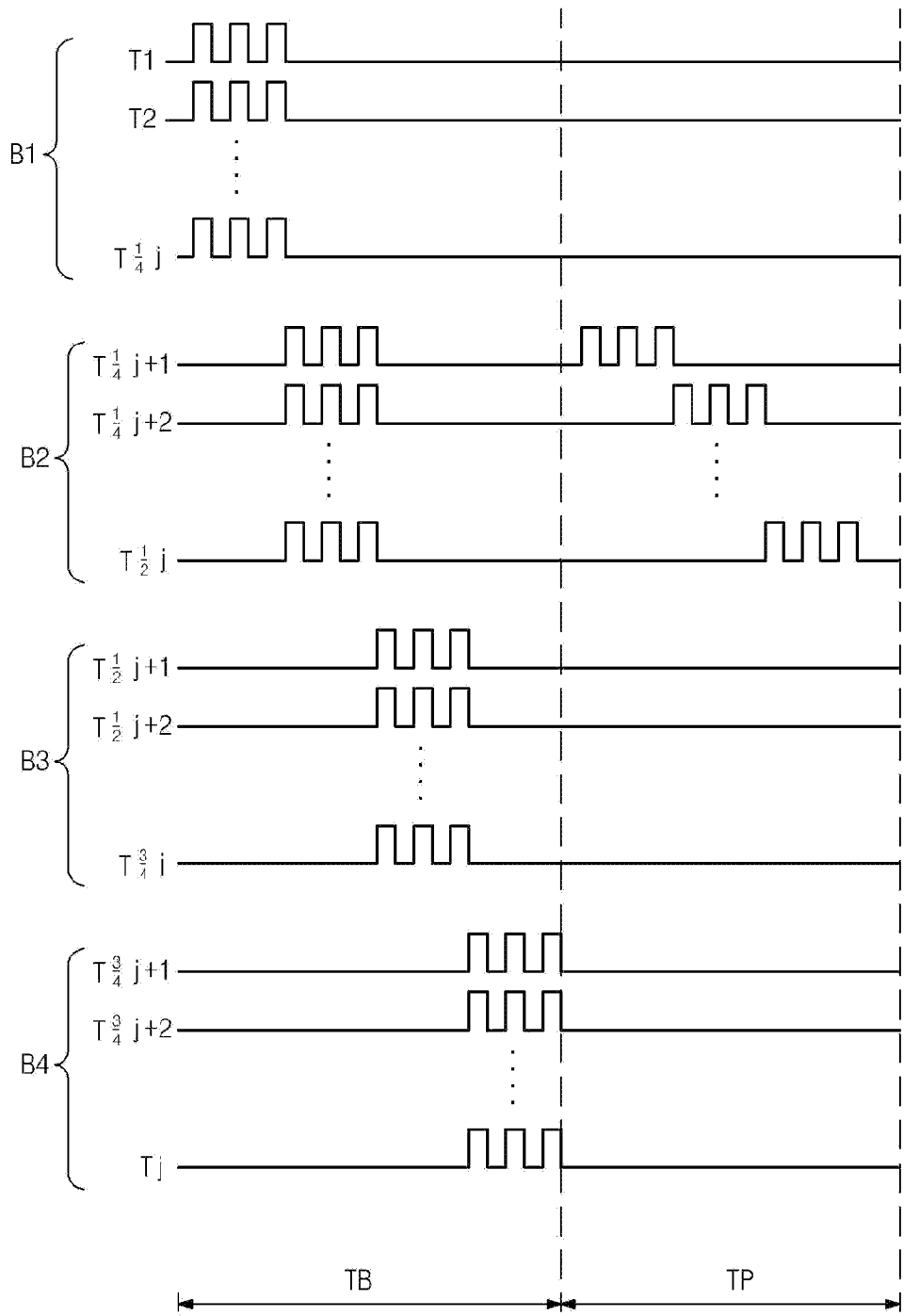
Figure 28:
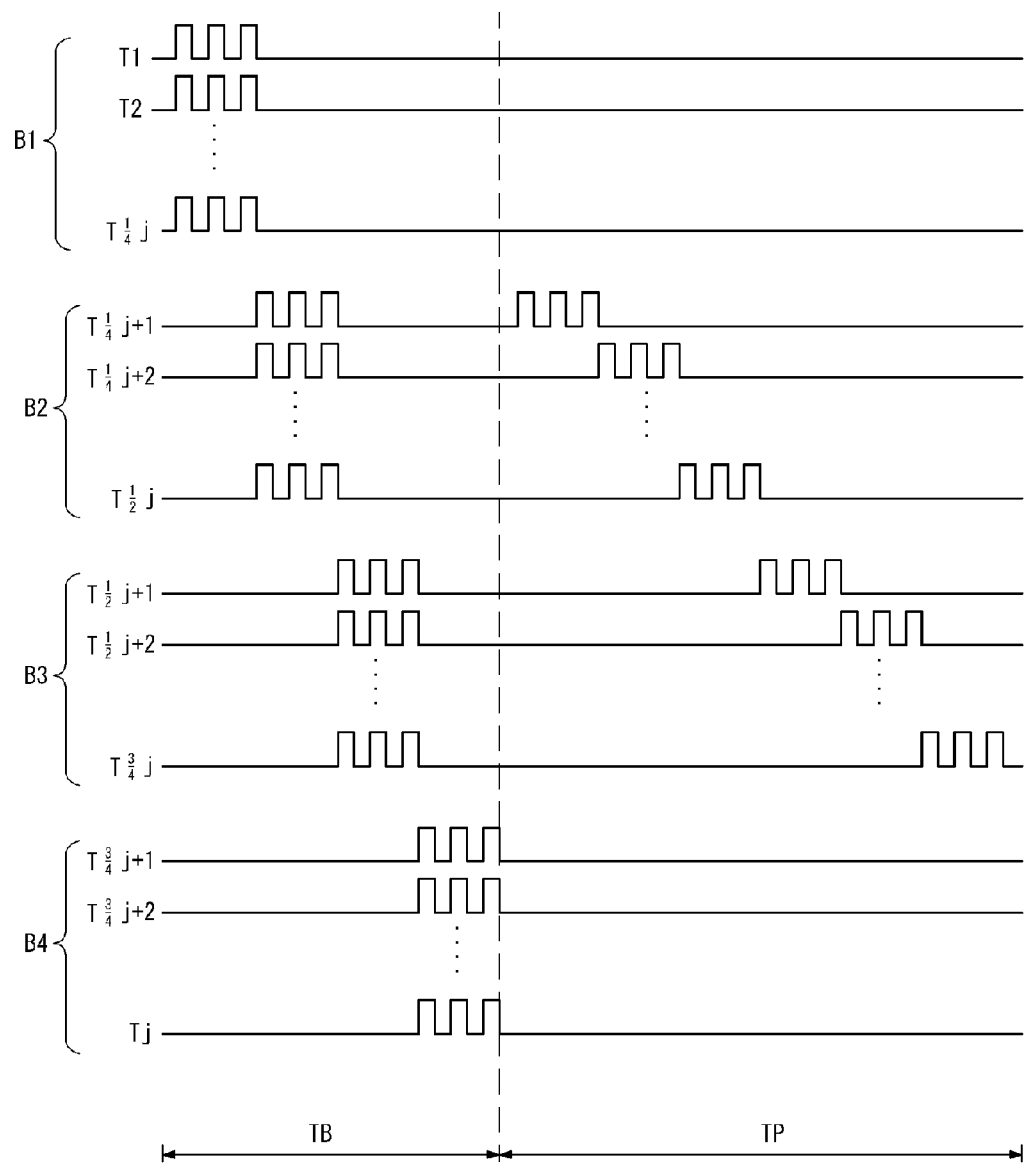
Figure 30:
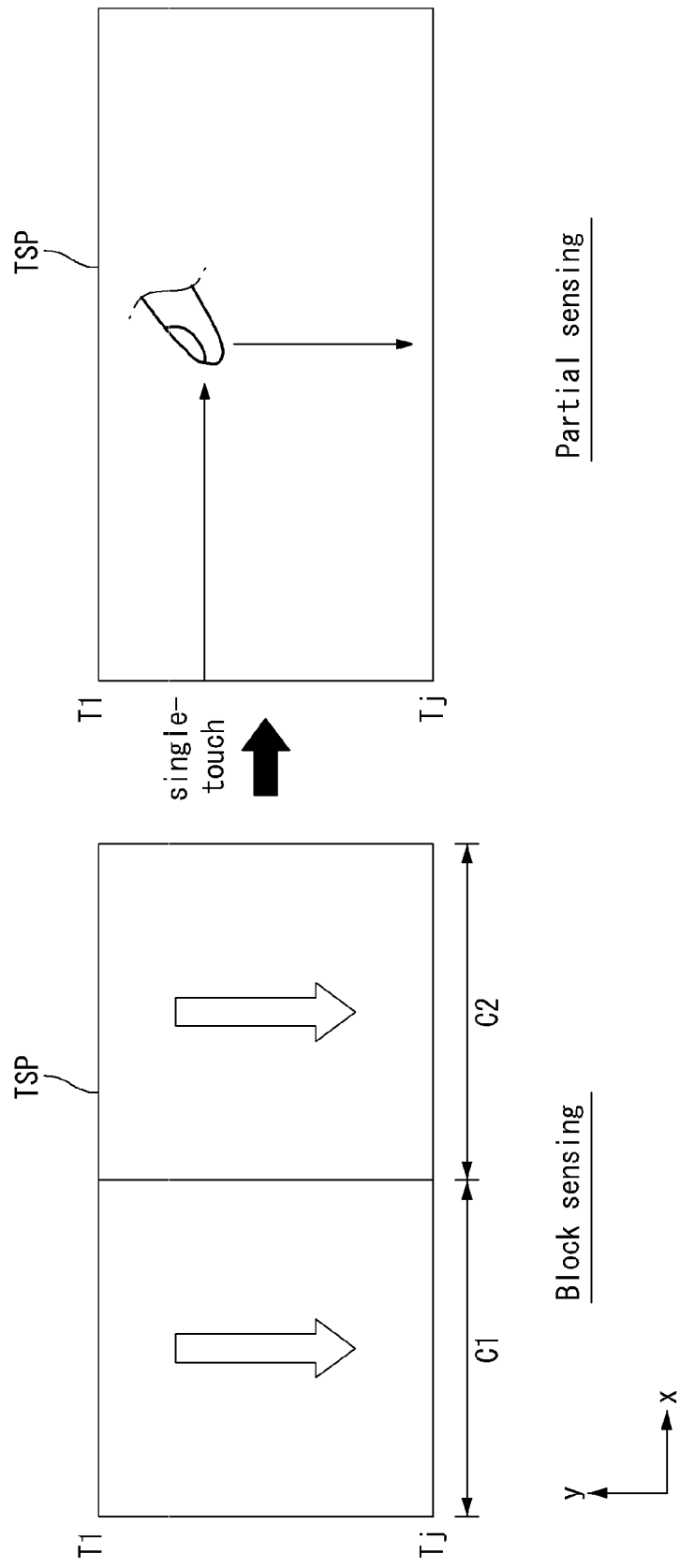
Figure 31:
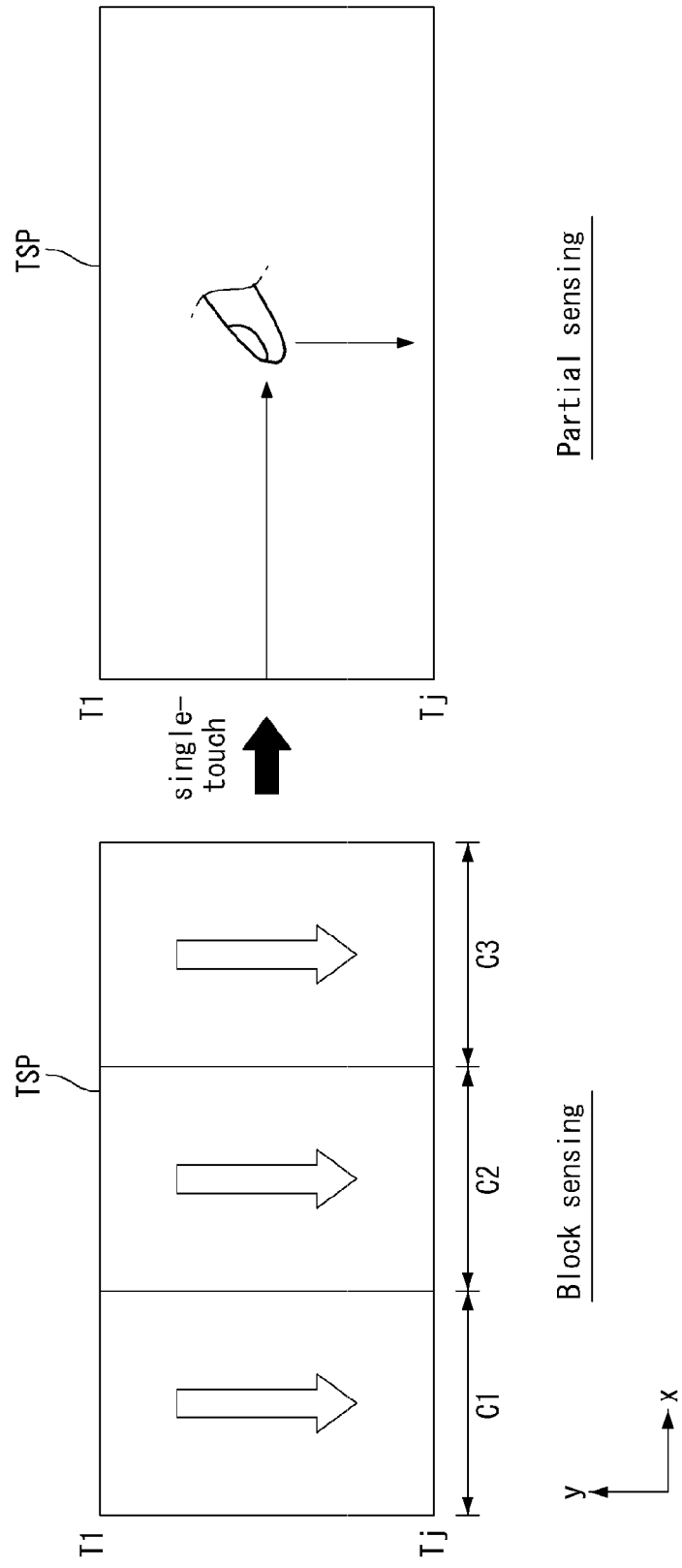
Figure 32:
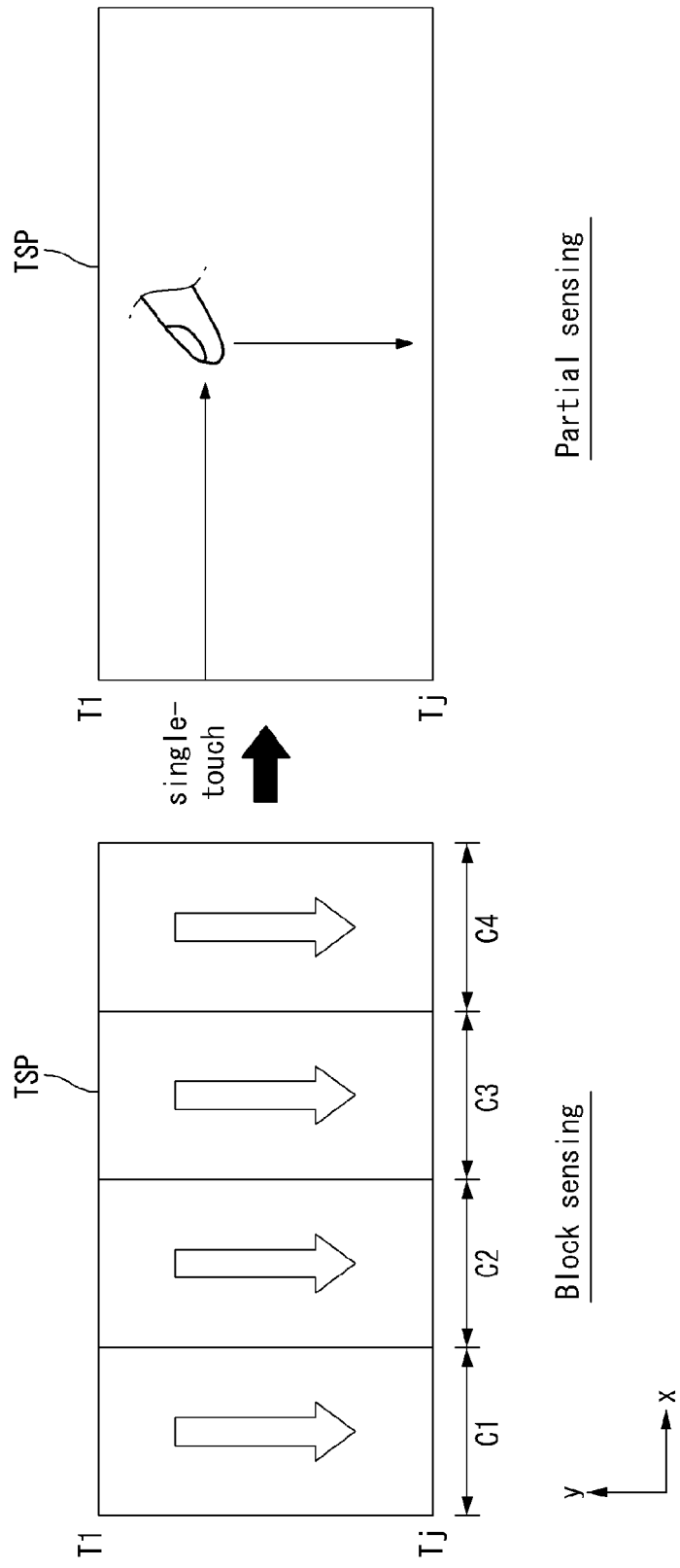

As shown in FIGS. 26 and 28, the Tx drive circuit 32 applies a drive signal to the Tx lines T1 to Tj in units of Tx blocks, and during a partial sensing period, supplies a drive signal only to the Tx lines T1 to Tj present within a Tx block from which a touch (or approach) is detected.

During a block sensing period, the Rx drive circuit 34 simultaneously senses voltages of the touch sensors through the Rx lines R1 to Ri in units of Rx blocks under the control of the touch controller 30, and converts them into digital data. Afterwards, during a partial sensing period, it may sequentially sample touch sensor voltages received through the Rx lines within an Rx block from which a touch (or approach) is detected as a block sensing result, and convert them into digital data. The Rx block comprises G Rx lines.

In the conventional art, the Tx drive circuit sequentially supplies a drive signal to Tx lines. In contrast, in the present invention, Tx driving time can be reduced a lot through the block sensing process, and a false touch detection can be prevented through the partial sensing process.

In response to a setup signal input from the touch controller 30, the Tx drive circuit 32 selects Tx lines in units of blocks to output driving signals during the block sensing period, and selects Tx lines in units of lines to output drive signals during the partial sensing period. Also, the Tx drive circuit 32 supplies drive signals to selected Tx lines T1 to Tj in response to a Tx setup signal. To repetitively accumulate voltages of the touch sensors TSNs N times and increase the charging amount of the sampling capacitor, as shown in FIGS. 9, 26, and 28, the drive signals respectively applied to the Tx lines T1 to Tj may comprise N drive signals which are consecutively generated at predetermined time intervals. If j touch sensors are connected to one Tx line, the N drive signals are consecutively supplied j times to the Tx line, and then drive signals are supplied to the next Tx line in the same manner.

In the conventional art, when sensing touch sensors connected to one Tx line, the Rx drive circuit sequentially samples and digitally converts voltages of the touch sensors. In contrast, the Rx drive circuit 34 of the present invention can reduce the reception and sampling time of touch sensor voltages by the block sensing process.

The Rx drive circuit 34 selects Rx lines R1 to Ri for receiving touch sensor voltages in response to an Rx setup signal input from the touch controller 30. The Rx drive circuit 34 receives and samples voltages of the touch sensors through the selected Rx lines in response to the Rx setup signal.

During a block sensing period, the Rx drive circuit 34 may simultaneously receive and sample voltages of the touch sensors through the Rx lines R1 to Ri in units of Rx blocks, and convert them into digital data. The Rx drive circuit 34 may sequentially receive and sample voltages of the touch sensors through the Rx lines within an Rx block from which a touch (or approach) is detected as a block sensing result, and convert them into digital data. The digital data output from the Rx drive circuit 34, which is touch raw data, is transmitted to the touch controller 30.

The touch controller 30 transmits a control signal CTRL to the ROIC comprising the Tx drive circuit 32 and the Rx drive circuit 34. The touch controller 30 analyzes touch raw data obtained as a block sensing result, and if a change in touch sensor voltage before and after a touch is greater than a predetermined threshold value, determines that the touch raw data is touch sensor data of a touch (or approach) input position, thereby detecting the presence or absence of a touch (or approach) input. When a touch (or approach) input is detected as a block sensing result, the touch controller 30 controls the Tx drive circuit 32 and the Rx drive circuit 34 in a partial sensing driving scheme. The touch controller 30 performs a partial sensing process to analyze touch raw data, obtained by precisely sensing touch sensors within a block from which a touch (or approach) input is detected by the block sensing process. As a partial sensing result, if a change in touch sensor voltage before and after a touch is greater than a predetermined threshold value, the touch controller 30 determines that the touch raw data is data obtained from the touch sensors at an actual touch (or approach) input position, and estimates the coordinates values for the touch sensors. The touch controller 30 transmits final touch coordinate data, containing the coordinates of the touch sensors detected from a touch (or approach) input in both of the block sensing process and the partial sensing process, to the host system.

If no touch (or approach) input is detected in the block sensing process, the touch controller 30 does not proceed to the partial sensing process but repeats the block sensing process. Accordingly, the touch controller can selectively omit the partial sensing process according to a block sensing result, thereby reducing the total sensing time of the touch screen without a decrease in touch sensitivity.

Figure 20:
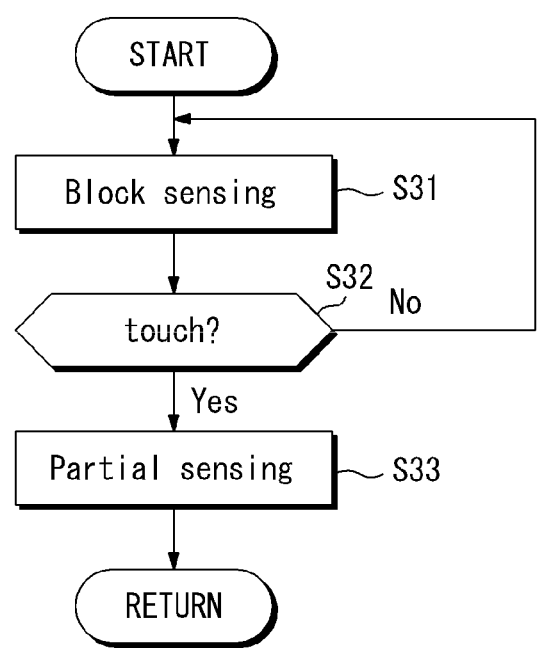
Figure 21:
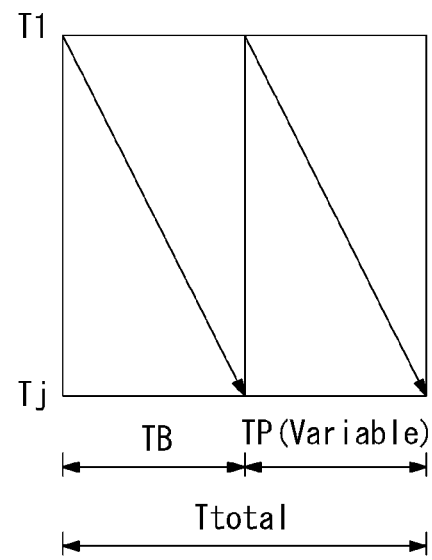
Figure 22:
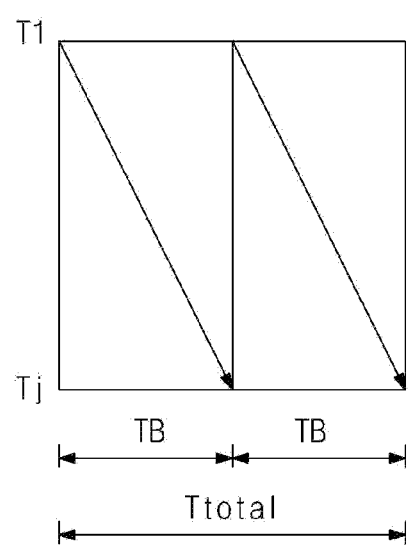
Figure 27:
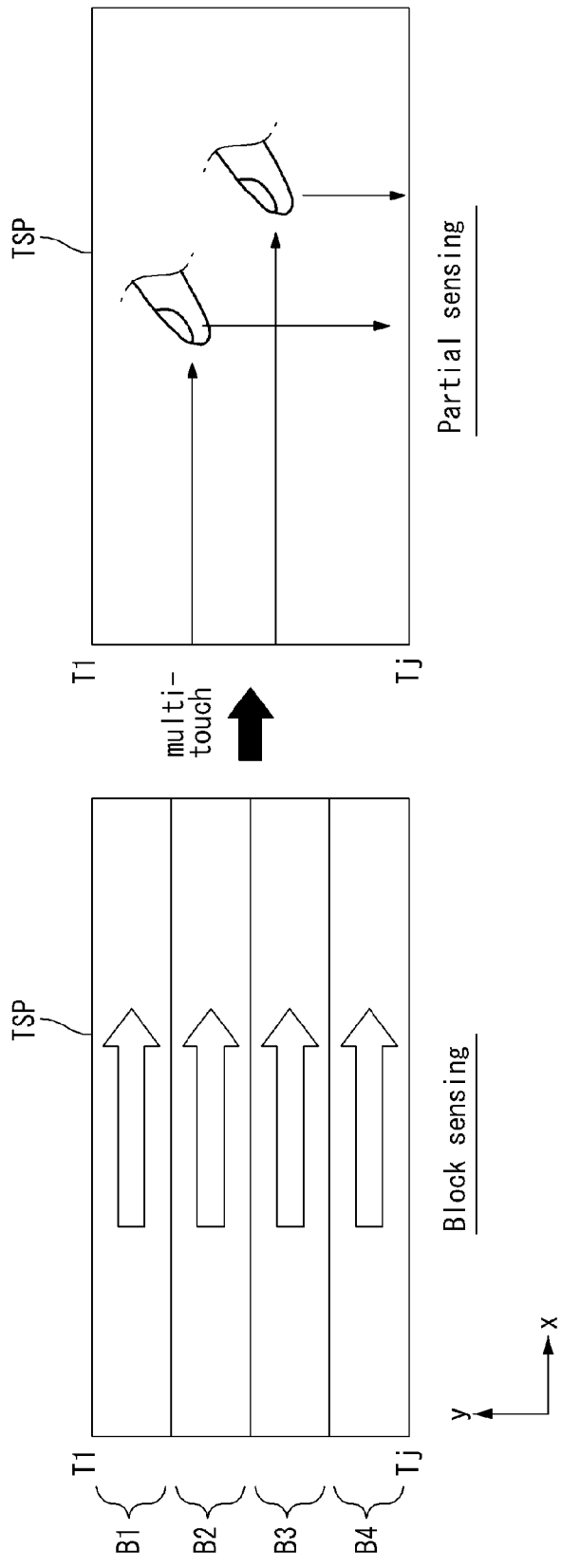

Referring to FIGS. 20 to 22, in the block sensing process, touch sensors are sensed in units of blocks so that all the touch sensors in the touch screen TSP are sensed during a first sensing time TB (S31). In the block sensing process, a drive signal is simultaneously supplied to the Tx lines present within the I-th block to simultaneously sense voltages of all the touch sensors present within the I-th block, and then a drive signal is simultaneously applied to the Tx lines present within the (I+1)th block to simultaneously sense voltages of all the touch sensors present within the (I+1)th block. As shown in FIGS. 26 to 28, a drive signal is simultaneously supplied to all the Tx lines in 1 block. Therefore, the first sensing time is only the time required to sense 1 line of the touch screen in the conventional art.

When a touch (or approach) input is detected as a block sensing result, the touch controller 30 proceeds to the partial sensing step to sequentially supply a drive signal, line by line, to the Tx lines in a block from which a touch (or approach) input is detected and precisely sense voltages of the touch sensors present within the block, thereby detecting a precise touch (or approach) input position (S32 and S33). A second sensing time TP is varied depending on the number of blocks from which a touch (or approach) input is detected.

Once a touch (or approach) input is detected in the block sensing process, the partial sensing process is performed, as shown in FIG. 21, subsequent to the block sensing process. On the other hand, if no touch (or approach) input is detected in the block sensing process, the block sensing process is performed again, subsequent to the block sensing process.

The total sensing time Ttotal required to sense all the touch sensors of the touch screen TSP is the sum of the first sensing time TB and the second sensing time TP, as shown in FIGS. 21 and 22. As a block sensing result, if touch (or approach) inputs are detected from several blocks, partial sensing of the blocks is performed. Accordingly, as shown in FIG. 22, the first sensing time TB required for block sensing is fixed, whereas the second sensing time required for partial sensing is variable because the second sensing time TP is lengthened if multiple touches (or approaches) are detected as a block sensing result.

Figure 23:
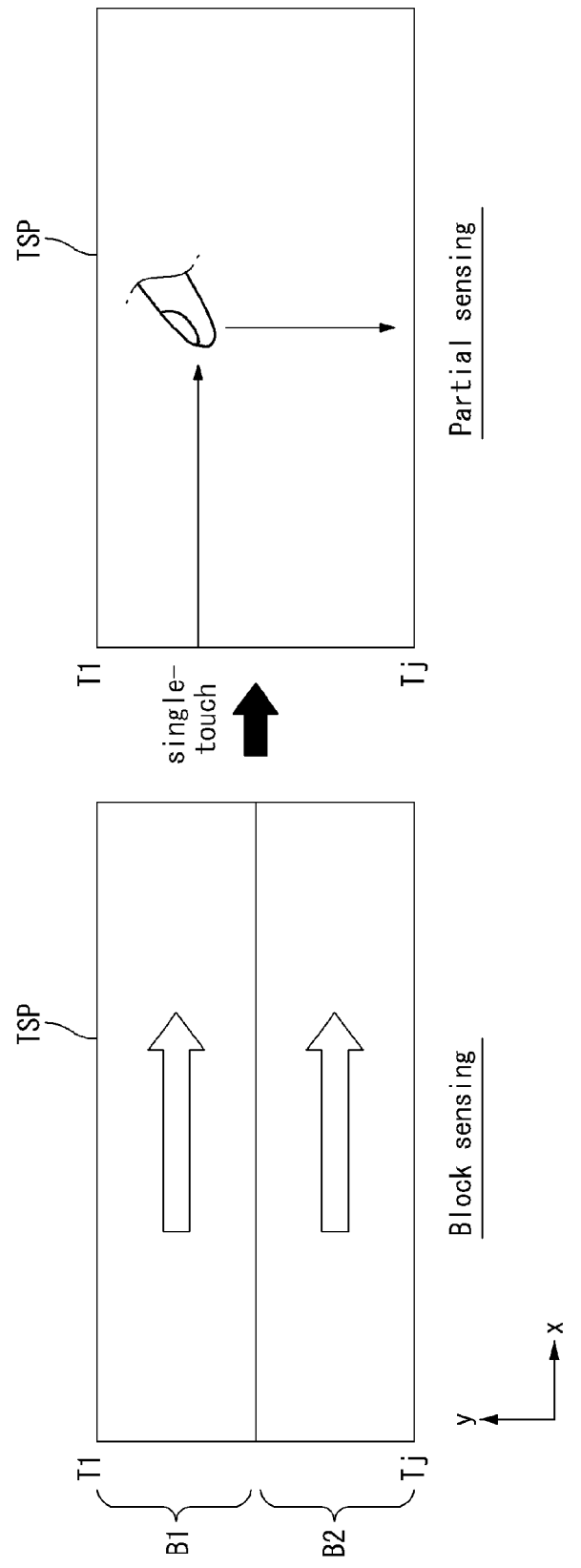
Figure 24:
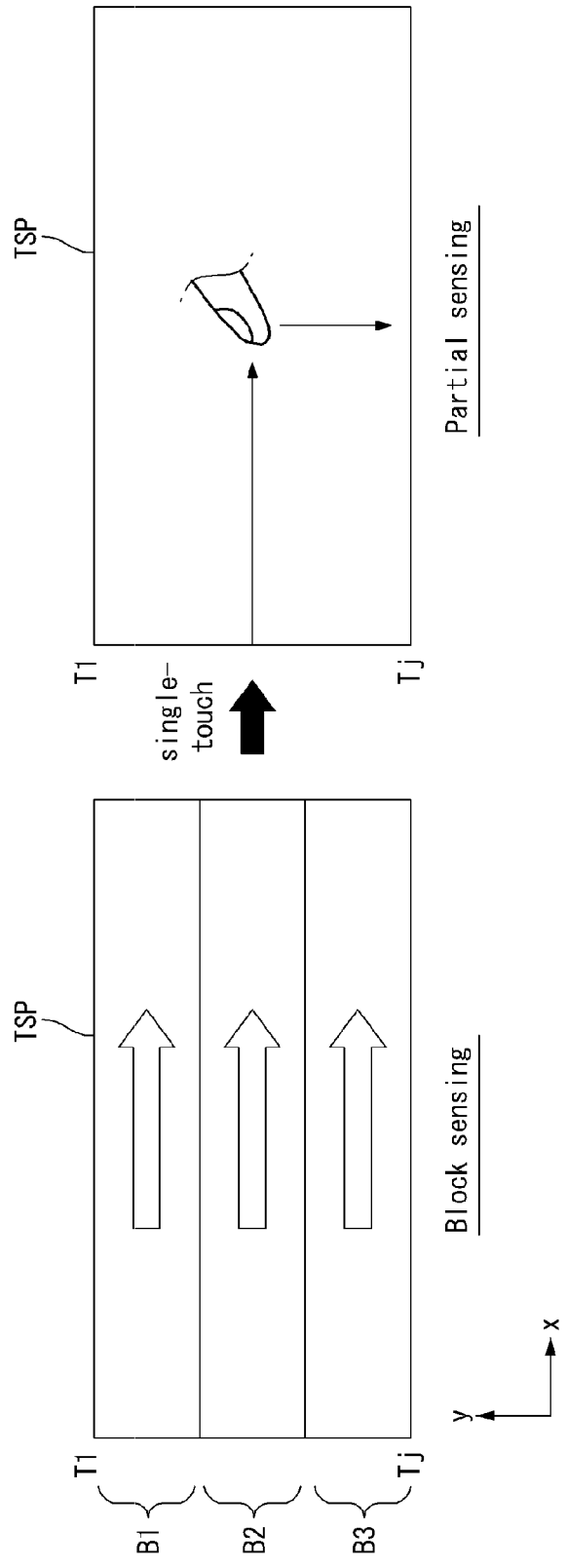
Figure 25:
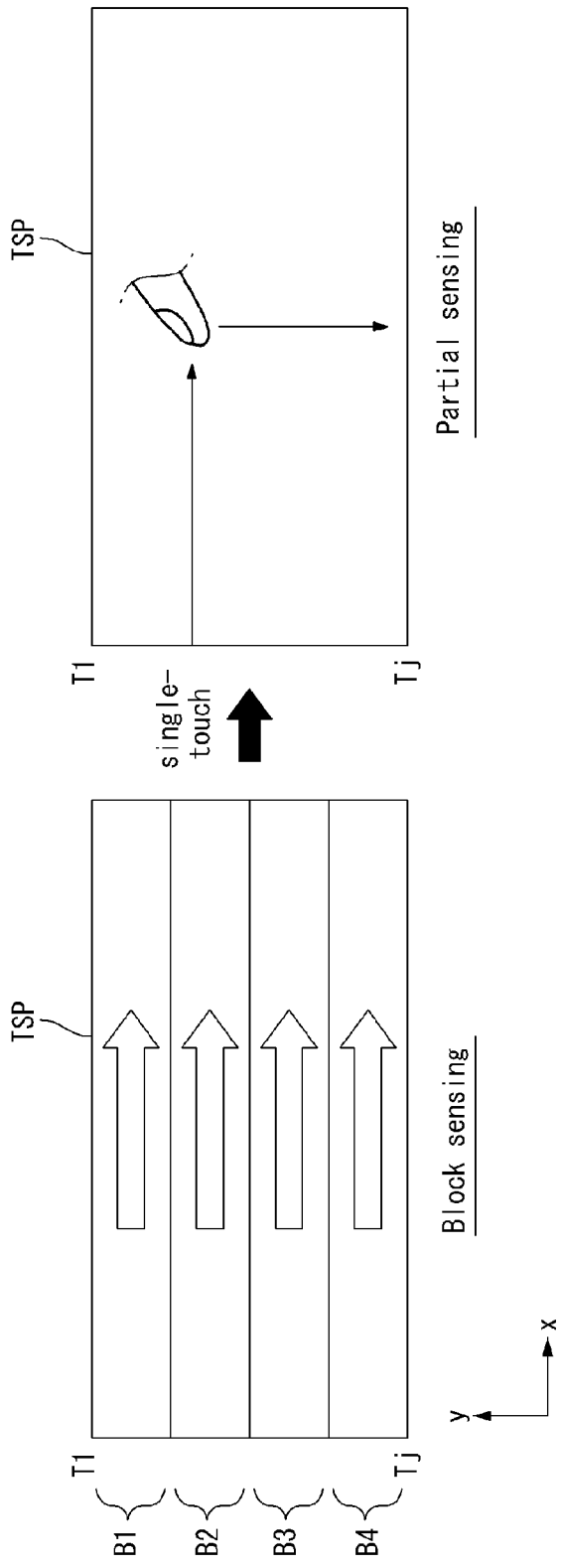

FIGS. 23 to 25 are views showing a block sensing process and a partial sensing process when the touch screen is driven separately in a plurality of Tx blocks along a y-axis.

When the touch screen TSP is divided into first and second Tx blocks B1 and B2, as shown in FIG. 23, the block sensing process is performed in such a manner that a drive signal is simultaneously supplied to all the Tx lines within the first Tx block B1, and then a drive signal is simultaneously supplied to all the Tx lines within the second Tx blocks B2, thereby detecting the presence or absence of a touch (or approach) input in units of Tx blocks. When a touch (or approach) input is detected within the first Tx block B1 by the block sensing process, the partial sensing process is performed. The partial sensing process is performed in such a manner that a drive signal is sequentially supplied to the Tx lines within the first Tx block B1 to precisely sense the touch sensors within the first Tx block B1 and, as a result, to detect a final touch (or approach) input. In the partial sensing process, the touch sensors within the second block B2 from which no touch (or approach) input is detected are not sensed.

When the touch screen TSP is divided into first to third Tx blocks B1 to B3, as shown in FIG. 24, the block sensing process is performed in such a manner that a drive signal is simultaneously supplied to all the Tx lines within the first Tx block B1, then a drive signal is simultaneously supplied to all the Tx lines within the second Tx blocks B2, thereby detecting the presence or absence of a touch (or approach) input in units of Tx blocks, and then a drive signal is simultaneously supplied to all the Tx lines within the third block B3, thereby detecting the presence or absence of a touch (or approach) input within the third Tx block B3. When a touch (or approach) input is detected within the second Tx block B2 by the block sensing process, the partial sensing process is performed. The partial sensing process is performed in such a manner that a drive signal is sequentially supplied to the Tx lines within the second Tx block B2 to precisely sense the touch sensors within the second Tx block B2 and, as a result, to detect a final touch (or approach) input. In the partial sensing process, the touch sensors within the first and third Tx blocks B1 and B3 from which no touch (or approach) input is detected are not sensed.

When the touch screen TSP is divided into first to fourth TX blocks B1 to B4, as shown in FIG. 25, the block sensing process is performed in such a manner that a drive signal is simultaneously supplied to all the Tx lines within the first Tx block B1, and then a drive signal is simultaneously supplied to all the Tx lines within the second Tx blocks B2. Next, the block sensing process is performed in such a manner that a drive signal is simultaneously supplied to all the Tx lines within the third Tx block B3, and then a drive signal is simultaneously supplied to all the Tx lines within the fourth Tx block B4, thereby detecting the presence or absence of a touch (or approach) input in units of Tx blocks. When a touch (or approach) input is detected within the second Tx block B2 by the block sensing process, the partial sensing process is performed. The partial sensing process is performed in such a manner that a drive signal is sequentially supplied to the Tx lines within the second Tx block B2 to precisely sense the touch sensors within the second Tx block B2 and, as a result, to detect a final touch (or approach) input. In the partial sensing process, the first, third, and fourth Tx blocks B1, B3 and B4 from which no touch (or approach) input is detected are not sensed. FIG. 26 is a waveform diagram showing drive signals supplied to Tx lines in the case of FIG. 25.

FIG. 27 is a view showing a block sensing process and a partial sensing process for a multiple touch (or approach) input. FIG. 28 is a waveform diagram showing drive signals supplied to Tx lines in the case of FIG. 27.

Referring to FIGS. 2 and 28, in the block sensing process, a drive signal is applied in units of Tx blocks to detect the presence or absence of a touch (or approach) input in units of Tx blocks. As a block sensing result, if a touch (or approach) input is detected from the second and third Tx blocks B2 and B3, respectively, the partial sensing process is performed. The partial sensing process is performed in such a manner that a drive signal is sequentially supplied to the Tx lines within the second Tx block B2, and a drive signal is sequentially supplied to the Tx lines within the third Tx block B3, thereby precisely sensing the touch sensors within the second and third Tx blocks B2 and B3. Accordingly, when a multiple touch (or approach) input is detected from several blocks as a block sensing result, the second sensing time TP is lengthened. In the partial sensing process, the touch sensors of the first and fourth Tx blocks B1 and B4 from which no touch (or approach) input is detected are not sensed.

Figure 34:
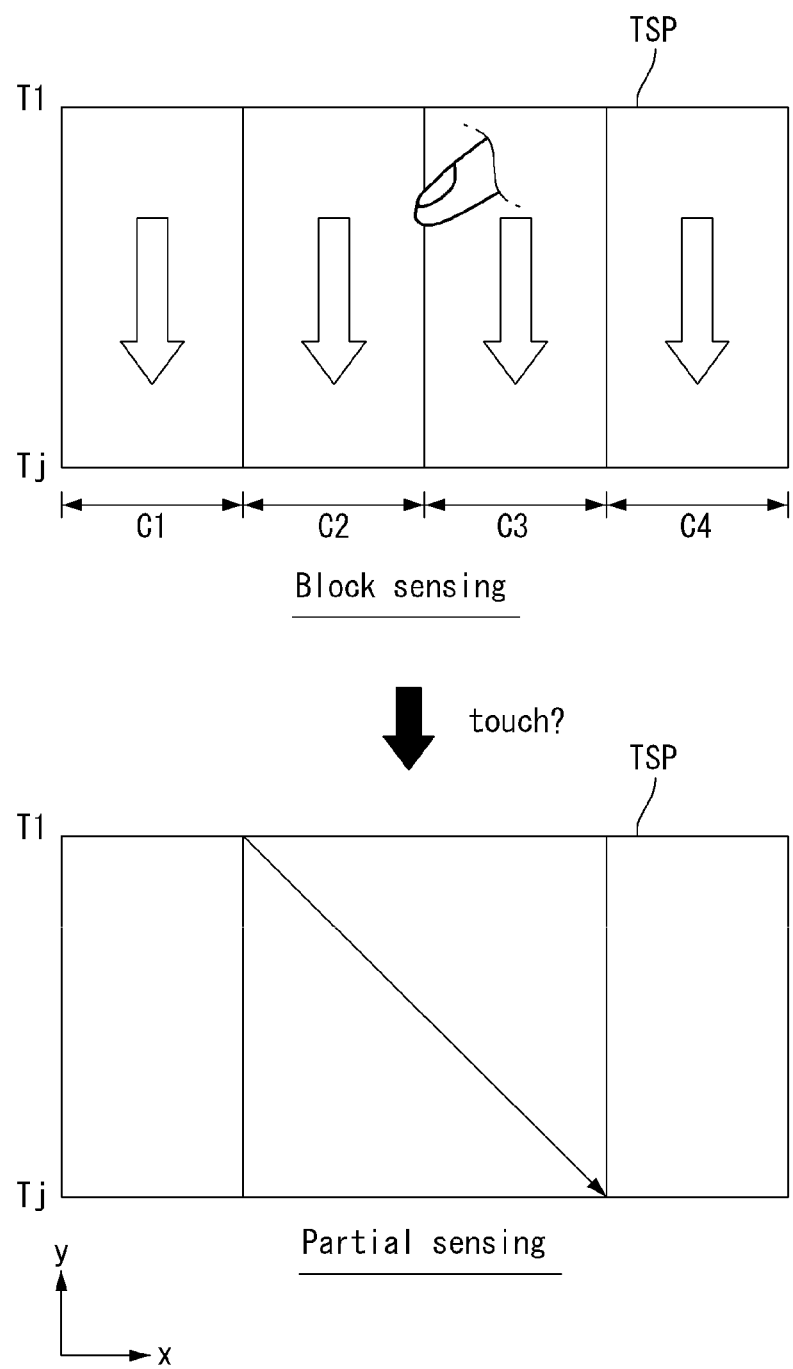

As shown in FIGS. 29 and 34, when a touch (or approach) input is detected at a boundary between neighboring Tx/Rx blocks, the partial sensing method is used to precisely sense neighboring blocks close to the touch (or approach) input position.

FIGS. 30 to 34 are views showing a block sensing process and a partial sensing process when the touch screen TSP is driven separately in a plurality of Rx blocks C1 to C4 along an x-axis.

Referring to FIGS. 30 to 34, the block sensing process is performed in such a manner that a drive signal is applied to TX blocks in units of Tx blocks, voltages of touch sensors are received and sampled for each of the first to fourth Rx blocks, and the sampled voltages are converted into digital data. For example, in the block sensing process, a first drive signal is simultaneously supplied to the Tx lines of the first TX blocks B1 to receive touch sensor voltages through the Rx lines of the first Rx block C1, and then a second drive signal is simultaneously supplied to the TX lines of the first TX block to simultaneously receives voltages of touch sensors through the Rx lines of the second Rx block C2. Next, in the block sensing process, a third drive signal is simultaneously supplied to the Tx lines of the first TX block B1 to simultaneously receive voltages of touch sensors through the Rx lines of the third Rx block C3, and then a fourth drive signal is simultaneously supplied to the TX lines of the first TX block to simultaneously receive voltages of touch sensors through the RX lines of the fourth Rx block C4. In this way, all the touch sensors within the first TX block are sensed by the block sensing process, and then the touch sensors of the next Tx block are sensed.

When a touch (or approach) input is detected by the block sensing process, the partial sensing process is performed. In the partial sensing process, all the touch sensors within a crossing area between a Tx block and an Rx block, connected to the touch sensors, from which a touch (or approach) input is detected as a block sensing result are precisely sensed. In more detail, in the partial sensing process, a drive signal is sequentially applied to the Tx lines of a Tx block from which a touch (or approach) input is detected as a block sensing result, touch sensor voltages are simultaneously or sequentially received and sampled through the Rx lines of an Rx block from which a touch (or approach) input is detected as a block sensing result, and the sampled voltages are converted into digital data. In the partial sensing process, no drive signal is applied to Tx blocks from which no touch (or approach) input is detected by the block sensing process, and no touch sensor voltages are received through Rx blocks from which no touch (or approach) input is detected by the block sensing process. As a block sensing result, if no touch (or approach) input is detected from all the blocks, the partial sensing process is not performed but the block sensing process is performed again.

Figure 33:
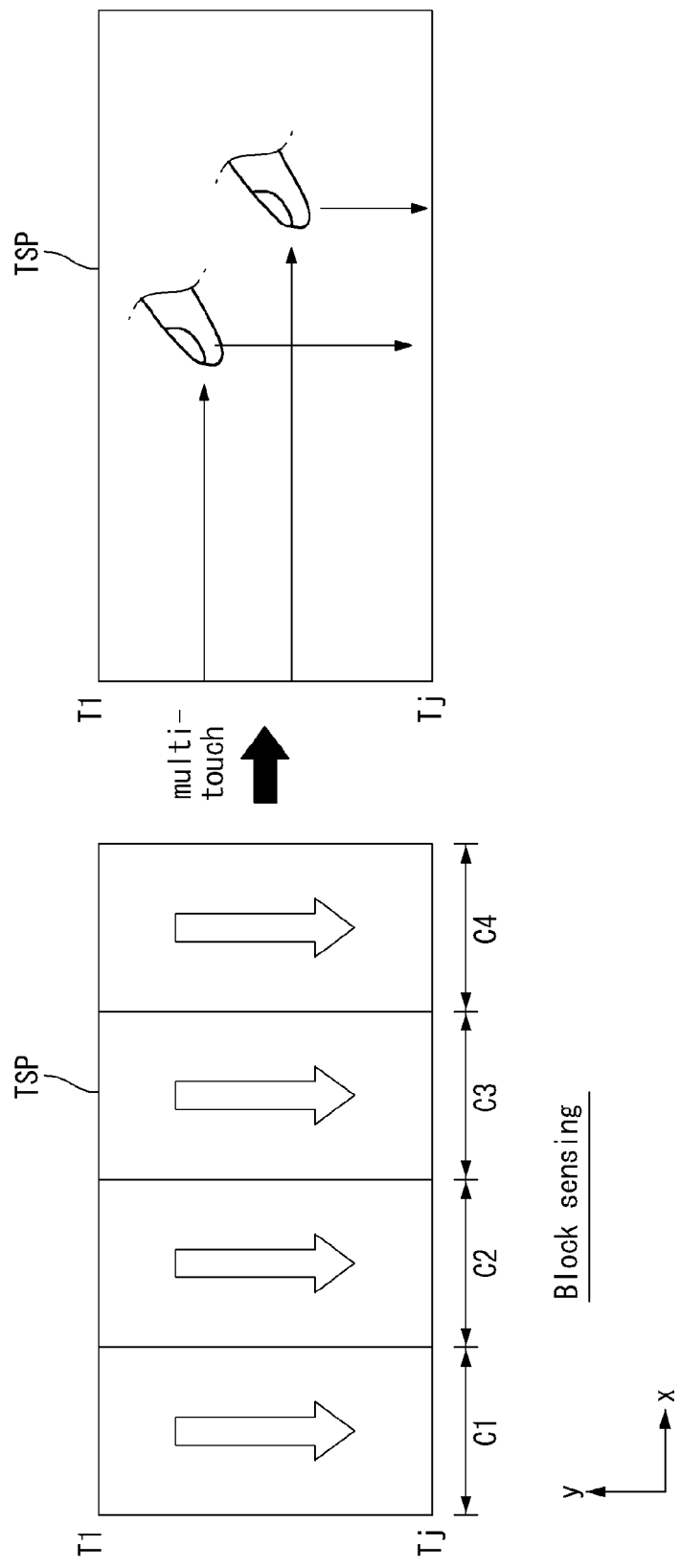

When a multiple touch (or approach) input is detected within a plurality of Rx blocks by the block sensing process, as shown in FIG. 33, the partial sensing process is performed in such a manner that a drive signal is sequentially applied to the Tx lines of each of Tx blocks from which a touch (or approach) input is detected, touch sensor voltages are simultaneously or sequentially received and sampled through the Rx lines of each of Rx blocks from which a touch (or approach) input is detected, and the sampled voltages are converted into digital data. In the partial sensing process, too, no drive signal is applied to Tx blocks from which no touch (or approach) input is detected by the block sensing process, and no touch sensor voltages are received through Rx blocks from which no touch (or approach) input is detected by the block sensing process. As a block sensing result, if no touch (or approach) input is detected from all the blocks, the partial sensing process is not performed but the block sensing process is performed again.

As shown in FIG. 34, when a touch (or approach) input is detected at a boundary between neighboring Rx blocks, the partial sensing process is performed in such a manner that a drive signal is sequentially applied to the Tx lines of a Tx block from which a touch (or approach) input is detected, touch sensor voltages are simultaneously or sequentially received and sampled through the Rx lines of the neighboring Rx blocks bordering the touch (or approach) input position, and the sampled voltages are converted into digital data. In the partial sensing process, too, no drive signal is applied to Tx blocks from which no touch (or approach) input is detected by the block sensing process, and no touch sensor voltages are received through Rx blocks from which no touch (or approach) input is detected by the block sensing process. As a block sensing result, if no touch (or approach) input is detected from all the blocks, the partial sensing process is not performed but the block sensing process is performed again.

The driving method of the touch screen apparatus according to the third exemplary embodiment of the present invention, as described in conjunction with FIG. 19, is applied along with the block sensing process and the partial sensing process to thus reduce the response speed of the touch screen apparatus a lot and significantly improve touch (or approach) sensitivity. Such a driving method of the touch screen apparatus is as shown in FIG. 35.

Referring to FIG. 35, in the driving method of the touch screen apparatus, the block sensing process and partial sensing process, as shown in FIGS. 20 to 34, are used to sense touch sensors of the touch screen TSP and obtain touch raw data TData (S41 to S43).

Next, in the driving method of the touch screen apparatus, a touch detection algorithm is executed to analyze touch raw data, detect the touch raw data as data of a touch (or approach) input position if the touch raw data is larger than a threshold value, and calculate the coordinates (S44a). At the same time, in the driving method of the touch screen apparatus, touch coordinate data, obtained as a result of execution of the touch detection algorithm, is transmitted to a host system.

The touch controller 30 may execute the touch detection algorithm to calculate the coordinates of a touch (or approach) input position for each line or frame of the touch screen. For example, in the step S44a, the touch controller 30 analyzes touch raw data TData obtained from an I-th line of the touch screen TSP, calculates the coordinates of a touch (or approach) input of the I-th line, and stores touch coordinate data containing the coordinates in a buffer memory. At the same time, in the step S44b, the touch controller 30 reads out touch coordinate data of an (I−1)-th line from the buffer memory and transmits it to an external host system.

Moreover, the touch controller 30 may transmit the touch coordinate data, obtained as an execution result of the touch detection algorithm, to the host system for each line or frame of the touch screen. The touch controller 30 may comprise a buffer memory temporarily storing the touch coordinate data containing the coordinates. For example, in the step S44a, the touch controller 30 analyzes touch raw data TData corresponding to 1 frame, obtained from all the touch sensors of the touch screen TSP, calculates the coordinates of a touch (or approach) input of an I-th frame, and stores touch coordinate data containing the coordinates in a buffer memory. At the same time, in the step S44b, the touch controller 30 reads out touch coordinate data of an (I−1)-th frame from the buffer memory and transmits it to an external host system.

As seen from above, it is possible to reduce the total sensing time of the touch screen a lot and achieve a higher touch report rate by performing the sensing operation and/or the ADC operation in parallel with the setup operation during the sensing operation time of the touch screen. Moreover, the total sensing time of the touch screen can be further reduced by using group setup. Further, noise of data obtained from touch sensors can be reduced because the sensing time of the touch screen in which noise entry may occur can be significantly reduced.

In the present invention, the total sensing time of the touch screen can be reduced, and the time required for execution of the touch detection algorithm and transmission of touch coordinate data can be reduced by performing the touch detection algorithm and the transmission of touch coordinate data in parallel.

In the present invention, the presence or absence of a touch (or approach) input can be quickly determined on a per-block basis by virtually dividing the touch screen into a plurality of more blocks and making use of the block sensing method. After that, the partial sensing method is applied only to a block from which a touch (or approach) input is detected so that a touch input position can be precisely sensed. As a result, the total sensing time of the touch screen can be minimized.

In the block sensing process and the partial sensing process, respectively, at least two operations among the setup operation, the sensing operation, and the ADC operation may be performed in parallel. Alternatively, the group setup operation may be performed, and then the sensing operation and the ADC operation may be performed in parallel. Moreover, the touch detection algorithm and the transmission of touch coordinate data are executed in parallel after execution of the block sensing process and the partial sensing process, thereby reducing the time required for the touch detection algorithm and the touch coordinate data transmission.

Furthermore, noise entry time, which may exert an adverse effect on the touch screen, can be reduced by reducing the total sensing time of the touch screen, and noise effects can be minimized and the accuracy of touch detection can be improved by identifying a false touch, mistaken as a touch in the block sensing process, by the partial sensing process.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen apparatus comprising:
a touch screen comprising Tx lines, Rx lines crossing the Tx lines, and touch sensors formed between the Tx lines and the Rx lines; and
a touch screen drive circuit that supplies a drive signal to the Tx lines, and samples voltages of the touch sensors received through the Rx lines and converts the sampled voltages into digital data,
wherein the touch screen drive circuit performs
a setup operation for selecting Tx lines to be supplied with the drive signal and Rx lines to receive the voltages of the touch sensors,
a sensing operation for supplying a drive signal to the Tx lines and receiving and sampling touch sensor voltages through the Rx lines,
an ADC operation for converting the sampled voltages into digital data,
a coordinate detection operation for analyzing the digital data by a preset touch detection algorithm and estimating the coordinates of a touch input position, and
a data transmission operation for transmitting touch coordinate data comprising the coordinates to an external system, and
the touch screen drive circuit performs at least two operations among the setup operation, the sensing operation, and the ADC operation in parallel.

2. The touch screen apparatus of claim 1, wherein the touch screen drive circuit comprises:
a Tx drive circuit that selects a Tx line in response to a Tx setup signal and supplies the drive signal to the selected Tx line;
an Rx drive circuit that selects an Rx line in response to an Rx setup signal, receives and samples a voltage of a touch sensor through the selected Rx line, and converts the sampled voltage in response to an ADC clock; and a touch controller that controls operation timings of the Tx drive circuit and the Rx drive circuit and generates one or more of the setup signals and the ADC clock during a sensing time.

3. The touch screen apparatus of claim 2, wherein the touch controller generates setup singles for selecting an (I+1)th touch sensor during the sensing time of an I-th (I is a positive integer).

4. The touch screen apparatus of claim 3, wherein the touch controller transmits an ADC clock to the Rx drive circuit,
the ADC clock being transmitted to convert a voltage of an (I−1)th touch sensor into digital data during the sensing time of the I-th (I is a positive integer) touch sensor.

5. The touch screen apparatus of claim 1, wherein the touch controller performs the coordinate detection operation and the data transmission operation in parallel.

6. The touch screen apparatus of claim 4, wherein the touch controller performs the coordinate detection operation and the data transmission operation in parallel.

7. The touch screen apparatus of claim 1, wherein, upon receipt of group setup information comprising a plurality of Tx setup information and a plurality of Rx setup information, the touch screen drive circuit performs the sensing operation and the ADC operation in parallel,
the group setup information comprises a plurality of Tx channel information and a plurality of Rx channel information for sensing touch sensors present in 1 line.

8. The touch screen apparatus of claim 7, wherein the touch screen drive circuit receives the group setup information and stores in a buffer memory, performs a setup operation for Tx lines and Rx lines required to sense all touch sensors in a currently sensed group, based on the group setup information read from the buffer memory, until the sensing of all the touch sensors in the group is completed, stores next group setup information received from the touch controller in the buffer memory after completion of the sensing of all the touch sensors in the currently sensed group, and performs a setup operation for Tx lines and Rx lines required to sense touch sensors in the next group based on the next group setup information read from the buffer memory.

9. The touch screen apparatus of claim 1, wherein, upon receipt of group setup information comprising a plurality of Tx setup information and a plurality of Rx setup information, the touch screen drive circuit performs the sensing operation and the ADC operation in parallel,
the group setup information comprising a plurality of Tx channel information and a plurality of Rx channel information for sensing all touch sensors of the touch screen.

10. The touch screen apparatus of claim 9, wherein the touch screen drive circuit receives the group setup information and stores in a buffer memory, performs a setup operation for Tx lines and Rx lines required to sense all touch sensors in a currently sensed group, based on the group setup information read from the buffer memory, until the sensing of all touch sensors of the touch screen is completed, stores next group setup information received from the touch controller in the buffer memory after completion of the sensing of all the touch sensors of the touch screen, and performs a setup operation for Tx lines and Rx lines required to sense all the touch sensors again based on the next group setup information read from the buffer memory.

11. The touch screen apparatus of claim 7, wherein the touch controller performs the coordinate detection operation and the data transmission operation in parallel.

12. The touch screen apparatus of claim 9, wherein the touch controller performs the coordinate detection operation and the data transmission operation in parallel.

13. The touch screen apparatus of claim 1, wherein the touch screen drive circuit virtually divides the touch screen into a plurality of blocks, simultaneously supplies a drive signal to the Tx lines in units of blocks to detect the presence or absence of a touch input in a block sensing process, and sequentially supplies the drive signal to the Tx lines of a block from which the touch input is detected to precisely sense the touch input position in a partial sensing process,
wherein the touch screen drive circuit performs at least two operations among the setup operation, the sensing operation, and the ADC operation in parallel for the block sensing process and the partial sensing process, respectively.

14. The touch screen apparatus of claim 7, wherein the touch screen drive circuit virtually divides the touch screen into a plurality of blocks, simultaneously supplies a drive signal to the Tx lines in units of blocks to detect the presence or absence of a touch input in a block sensing process, and sequentially supplies the drive signal to the Tx lines of a block from which the touch input is detected to precisely sense the touch input position in a partial sensing process.

15. The touch screen apparatus of claim 14, wherein the touch screen drive circuit performs the sensing operation and the ADC operation in parallel for the block sensing process and the partial sensing process, respectively.

16. The touch screen apparatus of claim 9, wherein the touch screen drive circuit virtually divides the touch screen into a plurality of blocks, simultaneously supplies a drive signal to the Tx lines in units of blocks to detect the presence or absence of a touch input in a block sensing process, and sequentially supplies the drive signal to the Tx lines of a block from which the touch input is detected to precisely sense the touch input position in a partial sensing process.

17. The touch screen apparatus of claim 14, wherein the touch screen drive circuit performs the sensing operation and the ADC operation in parallel for the block sensing process and the partial sensing process, respectively.

18. A driving method of a touch screen apparatus, which drives a touch screen comprising Tx lines, Rx lines crossing the Tx lines, and touch sensors formed between the Tx lines and the Rx lines, the method comprising:
executing a setup operation for selecting Tx lines to be supplied with the drive signal and Rx lines to receive the voltages of the touch sensors;
executing a sensing operation for supplying a drive signal to the Tx lines and receiving and sampling touch sensor voltages through the Rx lines;
executing an ADC operation for converting the sampled voltages into digital data;
executing a coordinate detection operation for analyzing the digital data by a preset touch detection algorithm and estimating the coordinates of a touch input position; and
executing a data transmission operation for transmitting touch coordinate data comprising the coordinates to an external system,
wherein at least two operations among the setup operation, the sensing operation, and the ADC operation are performed in parallel.

19. The method of claim 18, further comprising:
generating setup signals for selecting an (I+1)th touch sensor during the sensing time of an I-th (I is a positive integer); and
generating an ADC clock for converting a voltage of an (I−1)th touch sensor into digital data during the sensing time of the I-th touch sensor.

20. The method of claim 18, wherein the coordinate detection operation and the data transmission operation are performed in parallel.

\* \* \* \* \*